United States Patent
Oliver

(10) Patent No.: US 10,609,856 B2
(45) Date of Patent: Apr. 7, 2020

(54) AGRICULTURE SYSTEM AND METHOD

(71) Applicant: Troy Oliver, Madisonville, KY (US)

(72) Inventor: Troy Oliver, Madisonville, KY (US)

(*) Notice: Subject to any disclaimer, the term of this patent is extended or adjusted under 35 U.S.C. 154(b) by 188 days.

(21) Appl. No.: 15/687,498

(22) Filed: Aug. 27, 2017

(65) Prior Publication Data
US 2018/0054955 A1     Mar. 1, 2018

Related U.S. Application Data

(60) Provisional application No. 62/495,018, filed on Aug. 29, 2016.

(51) Int. Cl.

| | |
|---|---|
| F42D 3/00 | (2006.01) |
| A01B 79/02 | (2006.01) |
| A01B 3/24 | (2006.01) |
| A01B 35/32 | (2006.01) |
| F41H 11/14 | (2006.01) |
| A01B 37/00 | (2006.01) |
| A01B 17/00 | (2006.01) |
| A01B 49/04 | (2006.01) |
| F42D 1/045 | (2006.01) |
| F42B 1/04 | (2006.01) |

(52) U.S. Cl.
CPC .............. *A01B 79/02* (2013.01); *A01B 3/24* (2013.01); *A01B 17/002* (2013.01); *A01B 35/32* (2013.01); *A01B 37/00* (2013.01); *A01B 49/04* (2013.01); *F41H 11/14* (2013.01); *F42D 3/00* (2013.01); *F42B 1/04* (2013.01); *F42D 1/045* (2013.01)

(58) Field of Classification Search
CPC ........................................................ F42D 3/00
USPC .................... 405/178–183; 111/119; 299/13; 102/313, 315, 318, 320, 322, 324, 325; 181/114, 116; 86/20.15
See application file for complete search history.

(56) References Cited

U.S. PATENT DOCUMENTS

| | | | | |
|---|---|---|---|---|
| 3,729,060 A | * | 4/1973 | Murray | .................. E02F 5/102 181/116 |
| 3,840,846 A | * | 10/1974 | Dick | ........................ G01V 1/13 367/37 |
| 7,490,564 B2 | * | 2/2009 | Allan | ..................... A01B 79/02 111/119 |

FOREIGN PATENT DOCUMENTS

| | | | |
|---|---|---|---|
| GB | 1151882 A | * | 5/1969 |
| GB | 1151883 | * | 5/1969 |

* cited by examiner

*Primary Examiner* — Sunil Singh
(74) *Attorney, Agent, or Firm* — Chris Tanner; FYPA PLLC TannerPatent.com

(57) ABSTRACT

An agricultural enhancement method for removing or overcoming soil fragipan, hardpan, or other natural and/or artificial soil compaction barriers is disclosed. These barriers prevent root and/or water penetration, which inhibits agricultural development. Consequently, removing and overcoming these barriers is beneficial to the soil and to agricultural yields.

17 Claims, 31 Drawing Sheets

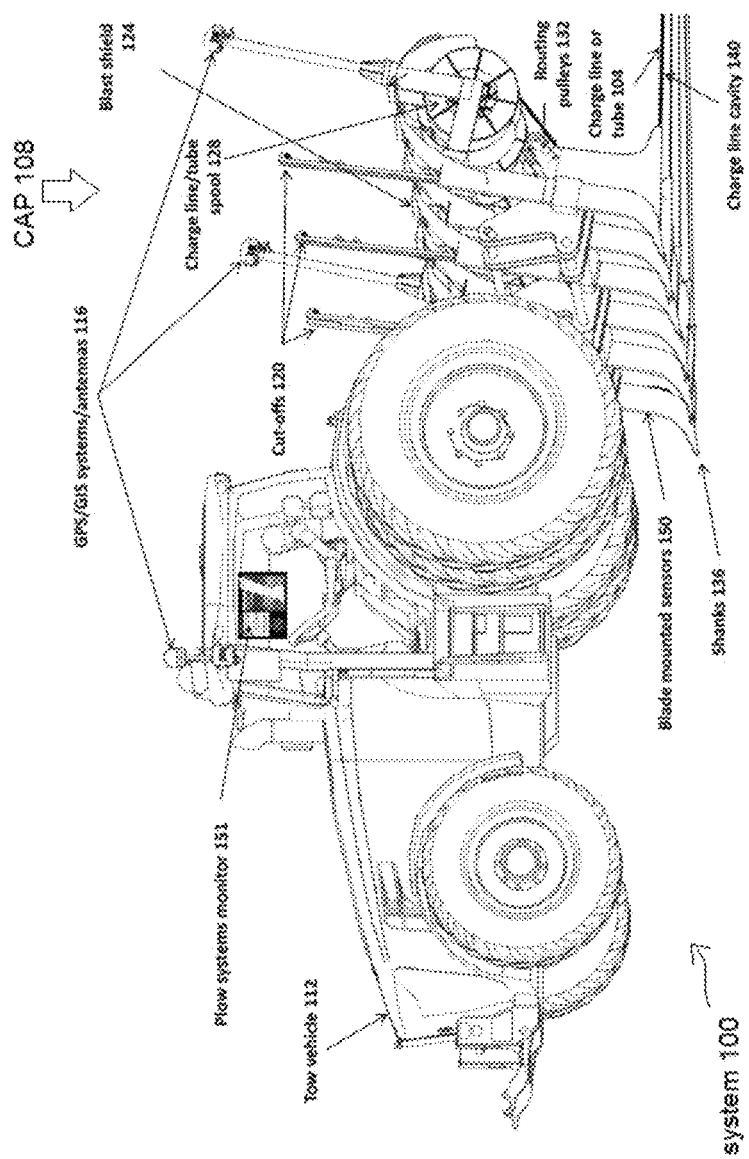
FIG. 1 Tractor (Rubber tire vehicle) mounted

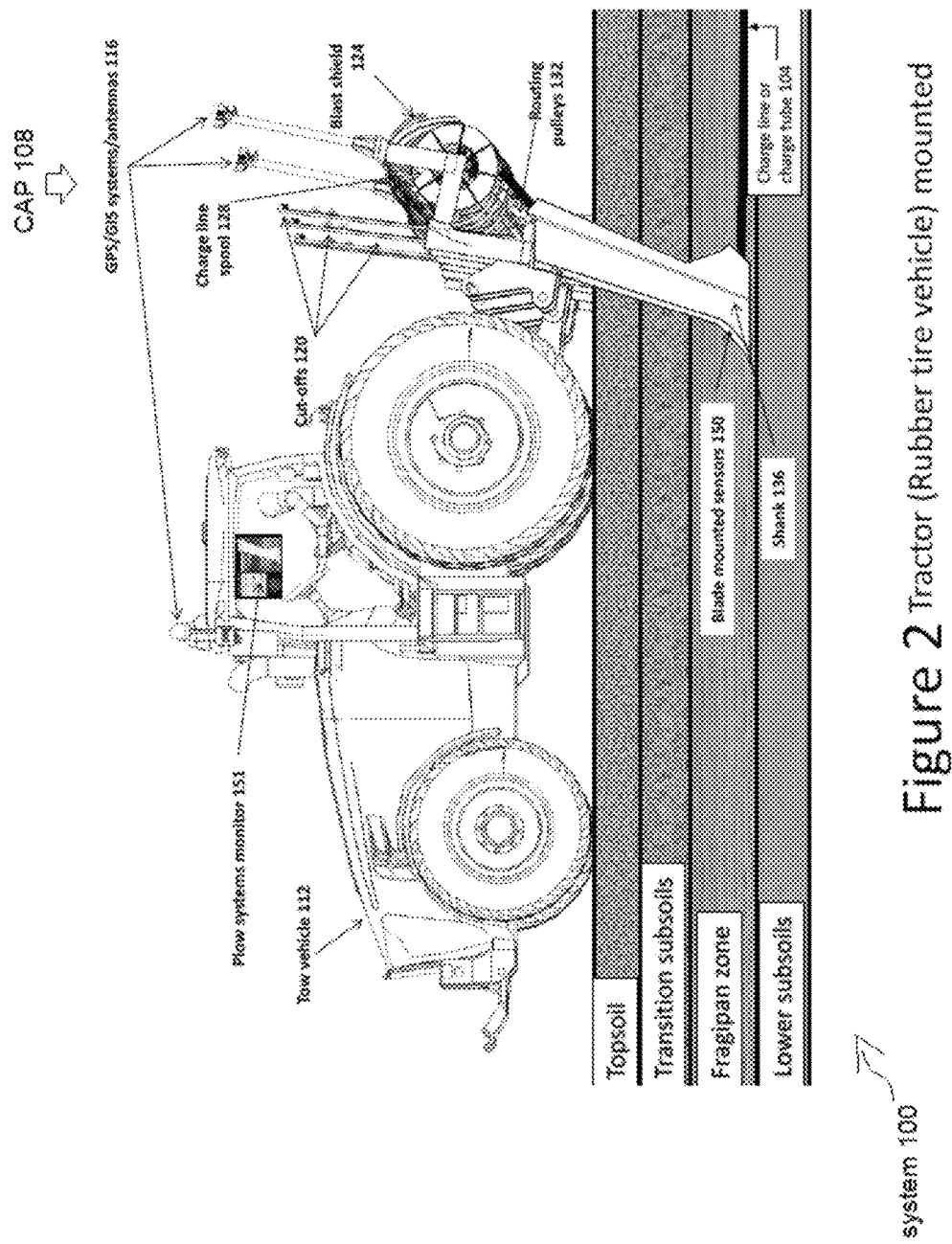

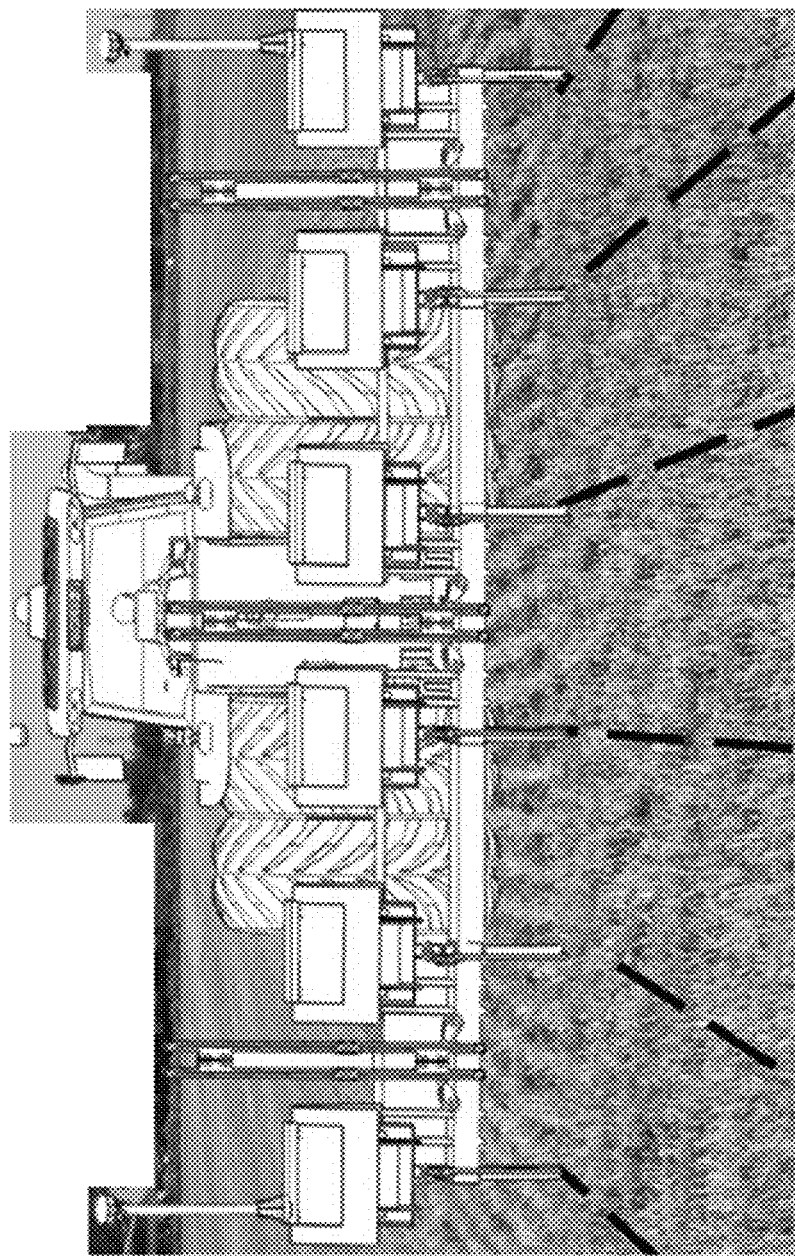
FIG. 3 treatment scenario
system 100

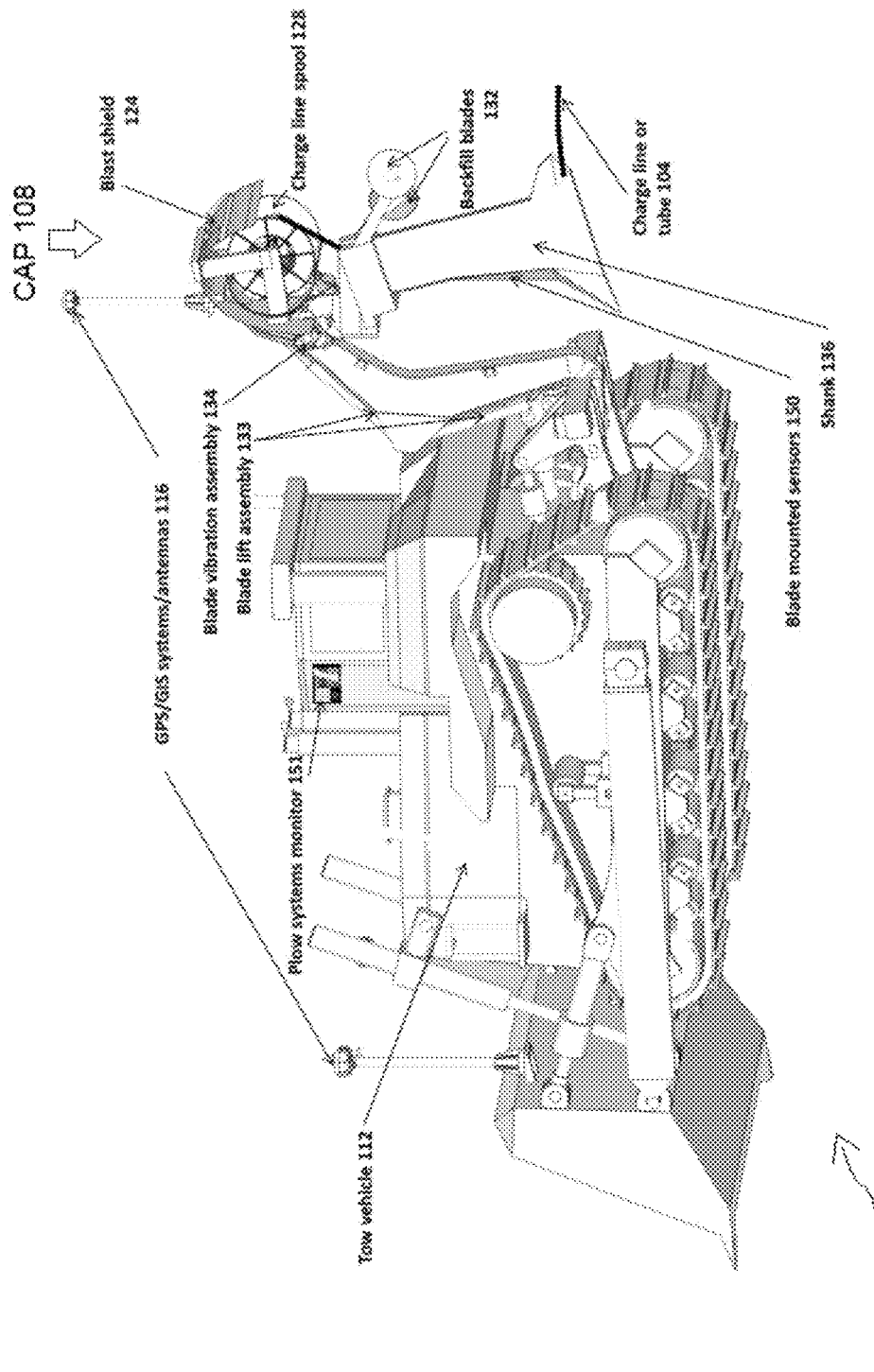
FIG. 4 Dozer (track vehicle) mounted

104A

104D

104B

104E

104C

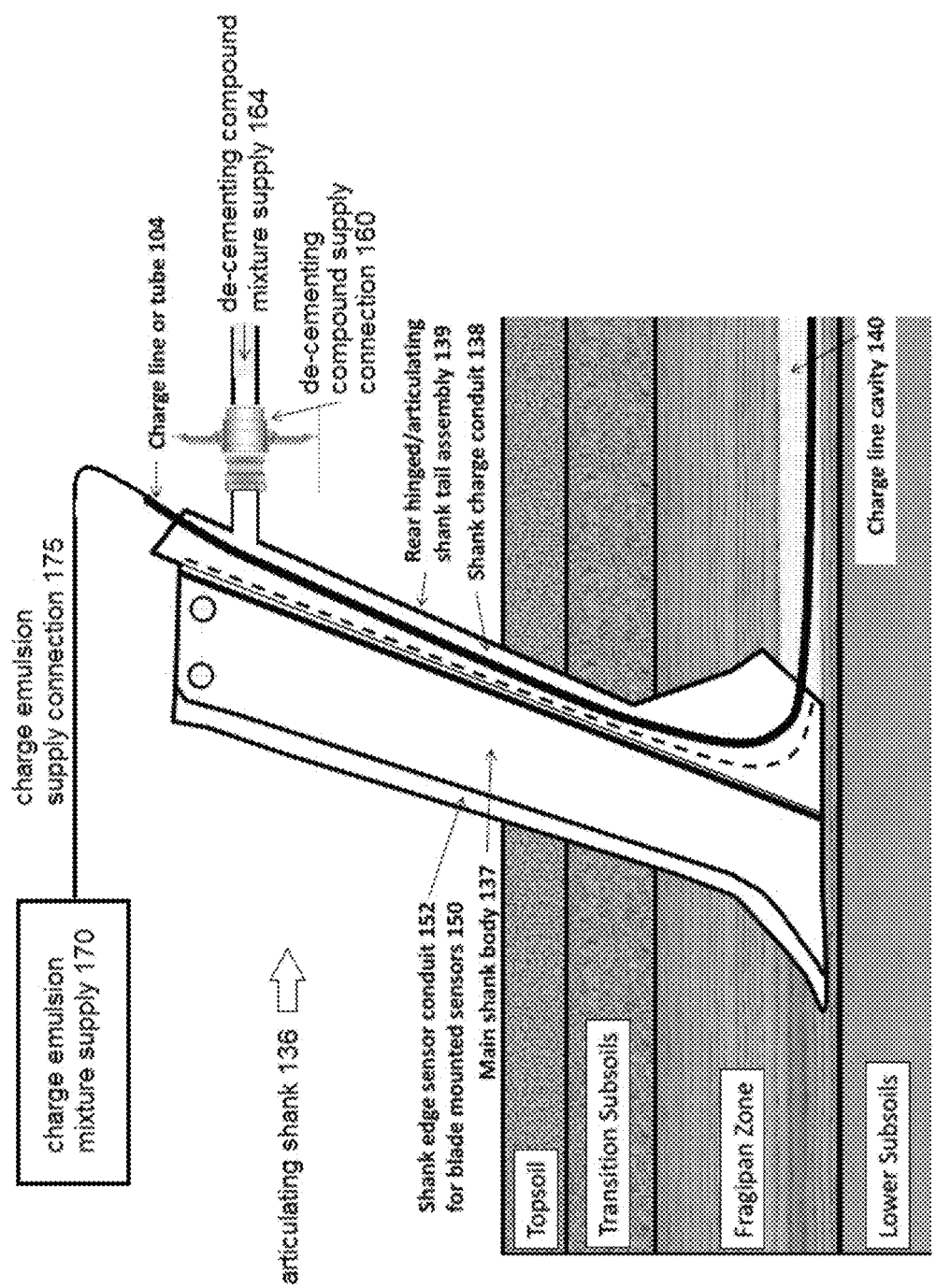
FIG. 8A   articulating shank 136 with de-cementing mixture injection

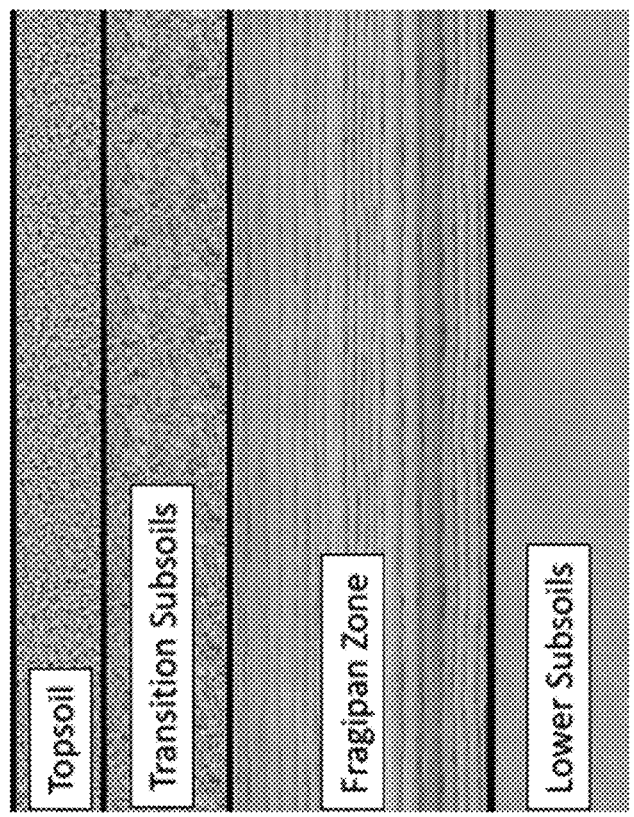
FIG. 9 (Prior Art) untreated soil

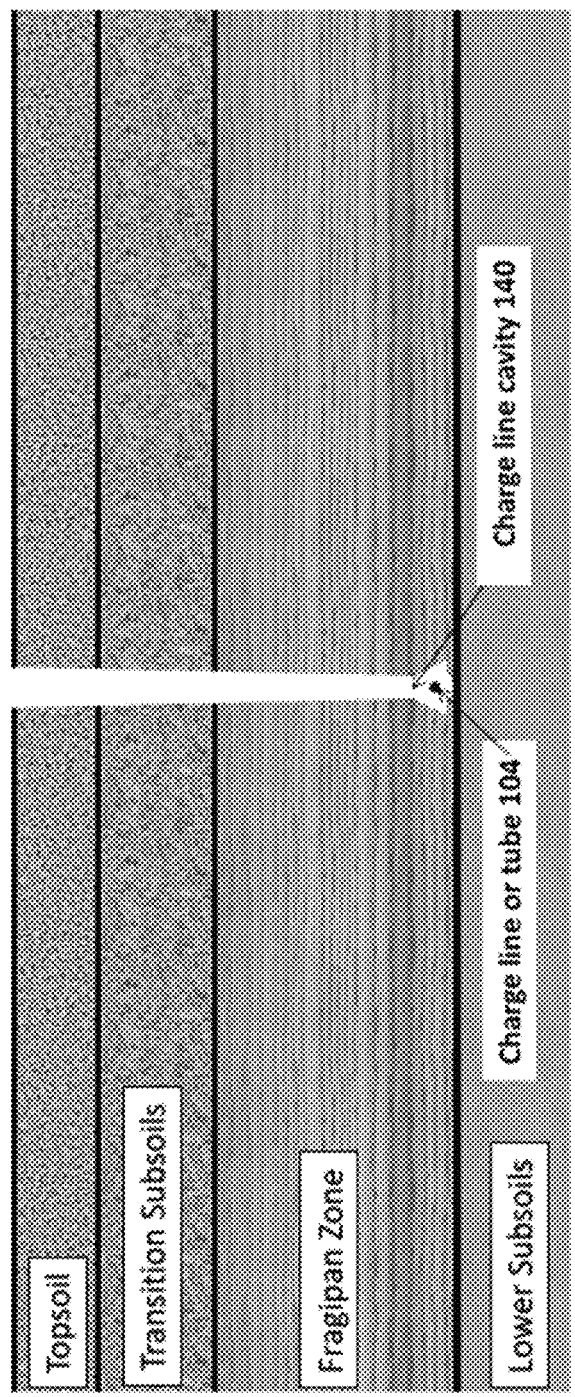
FIG. 10 (placement of charge line 104)

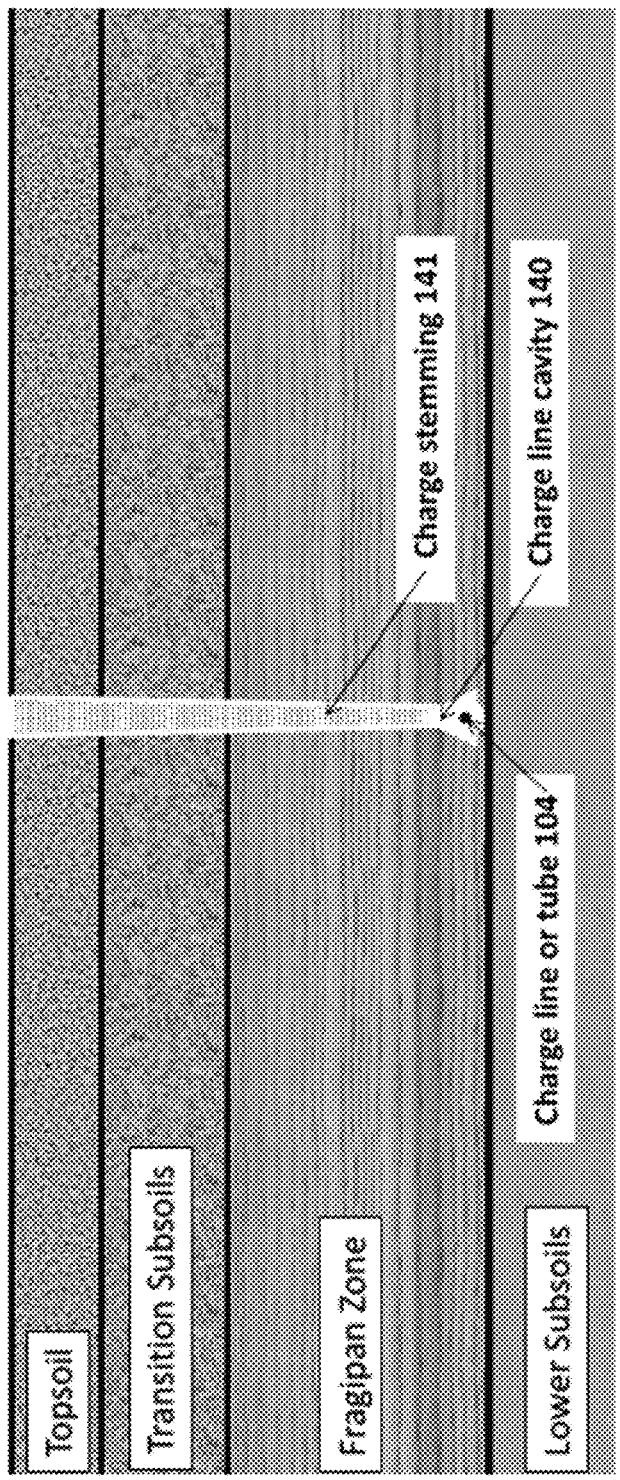
FIG. 11 (charge placed and cavity backfilled)

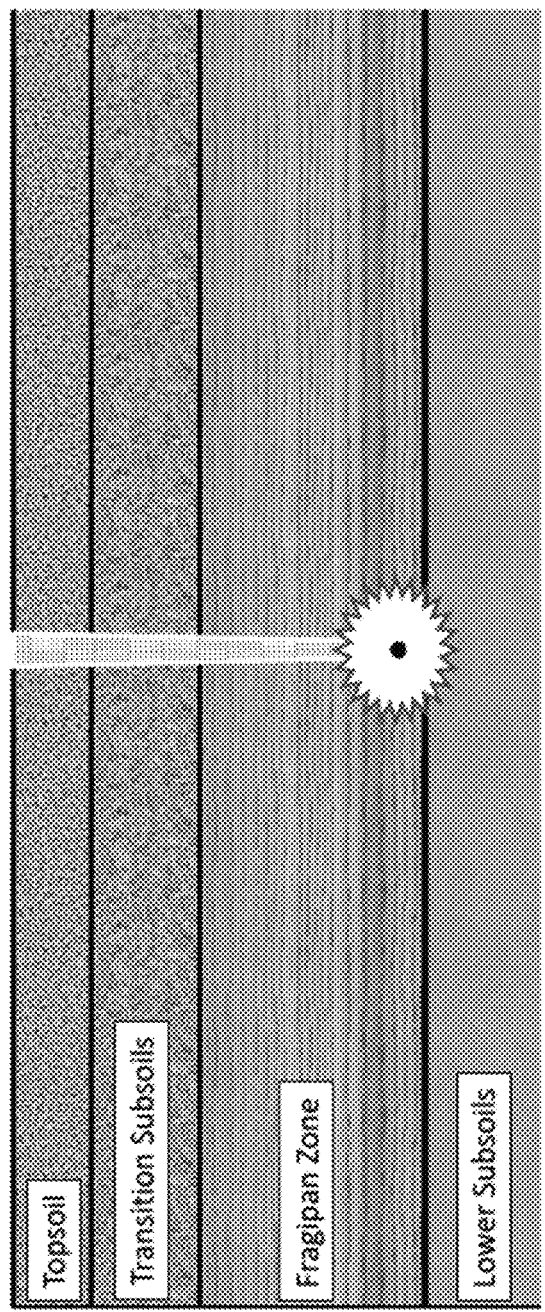
FIG. 12 (charge initiation)

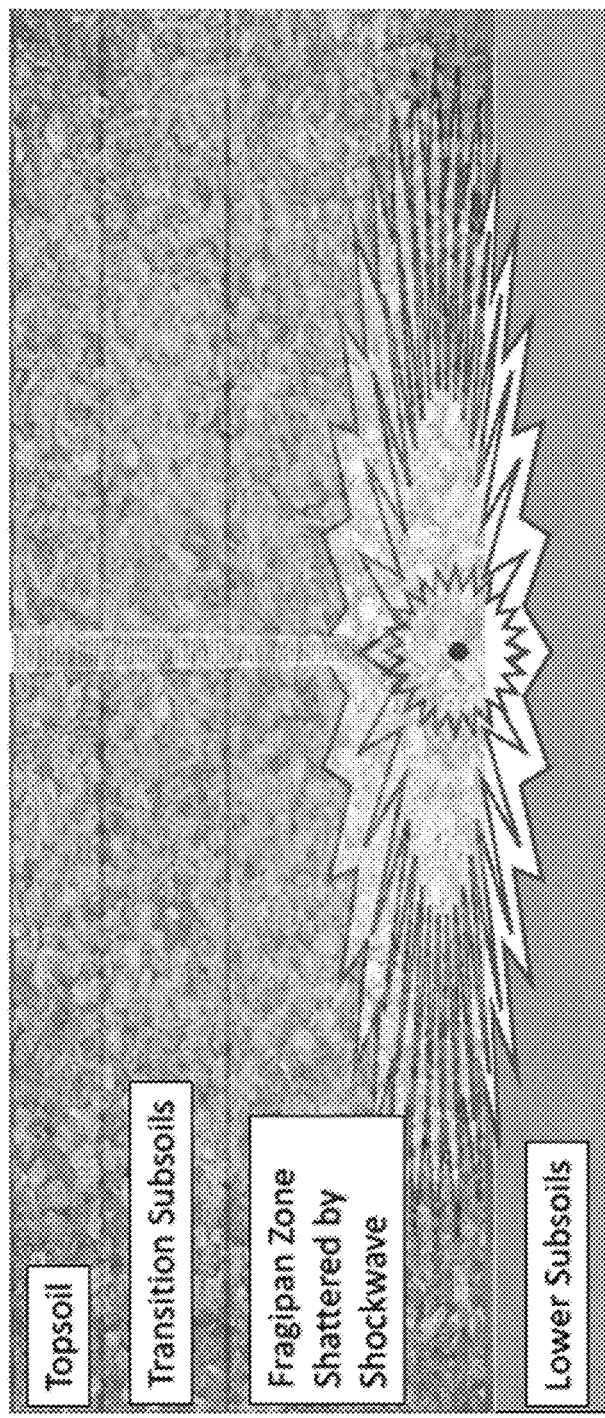
FIG. 13A (detonation shockwave)

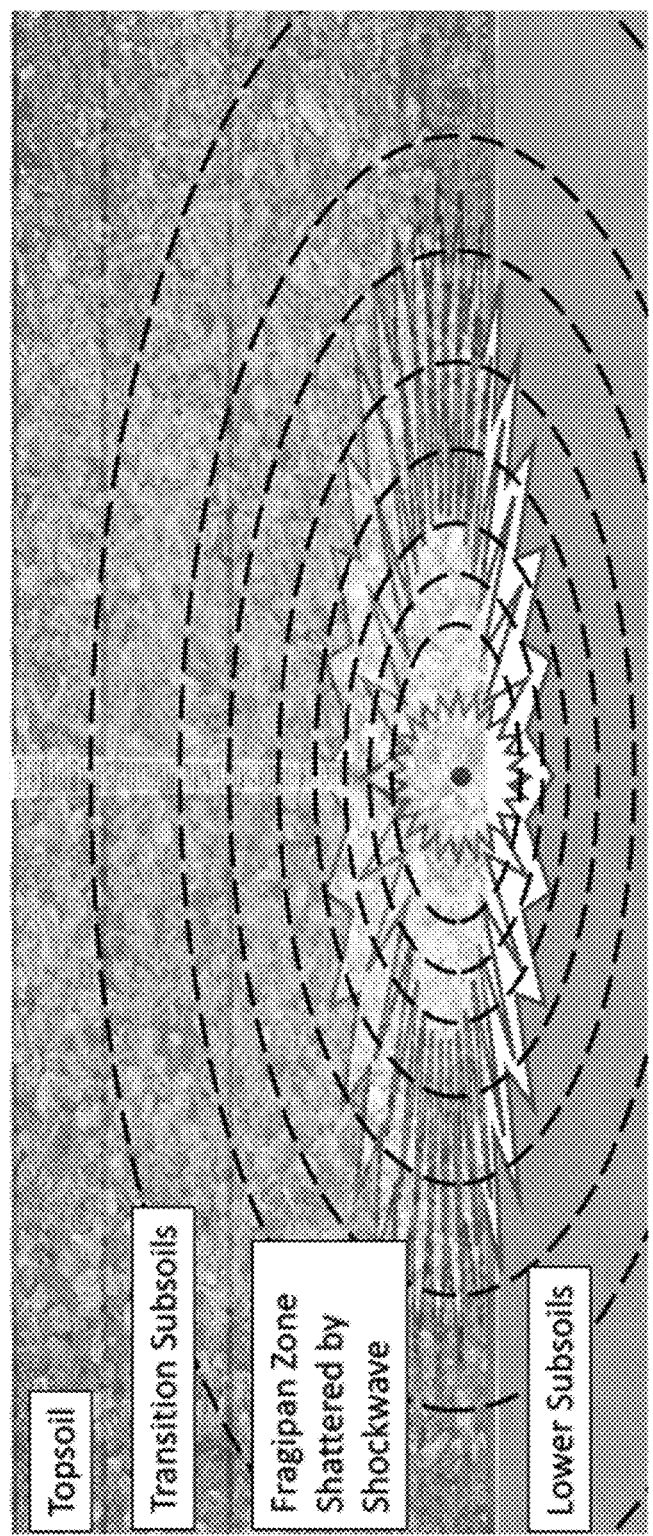
FIG. 13B (detonation shockwave)

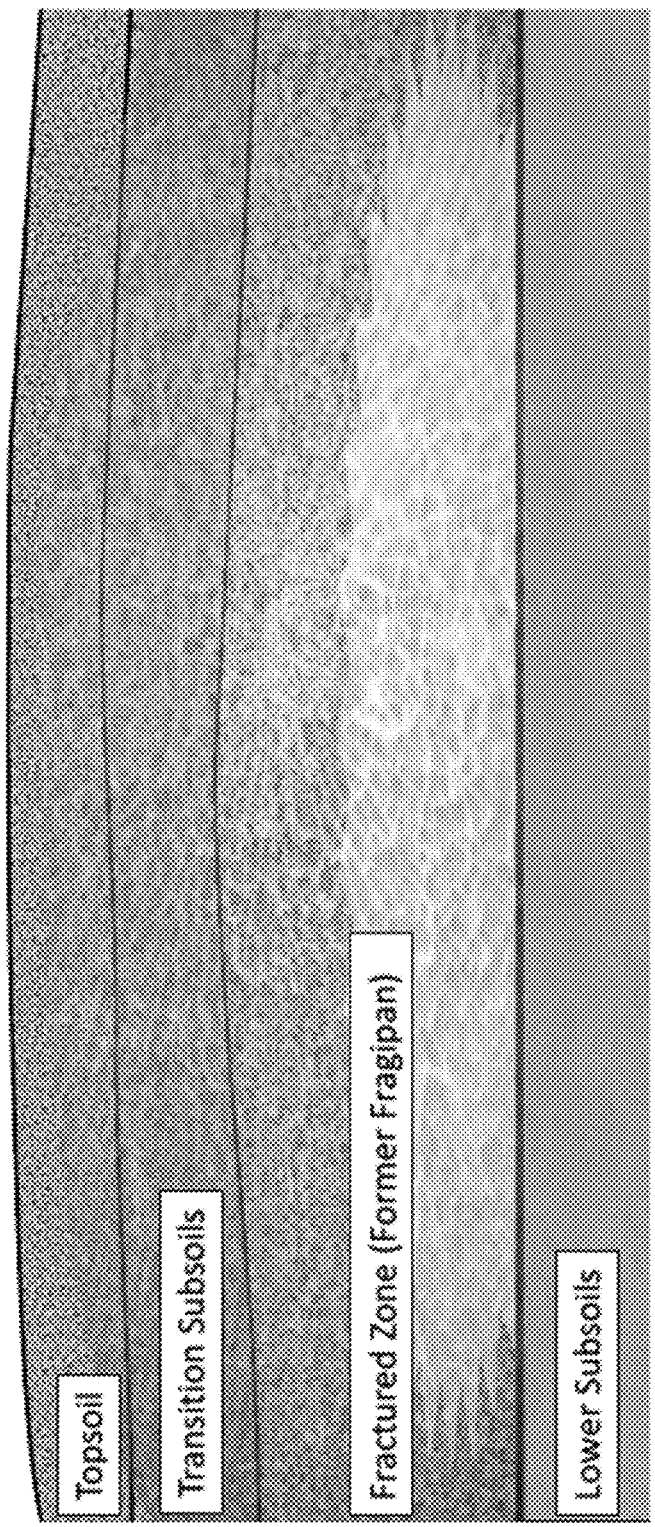
FIG. 14 (expanded gas lift and release)

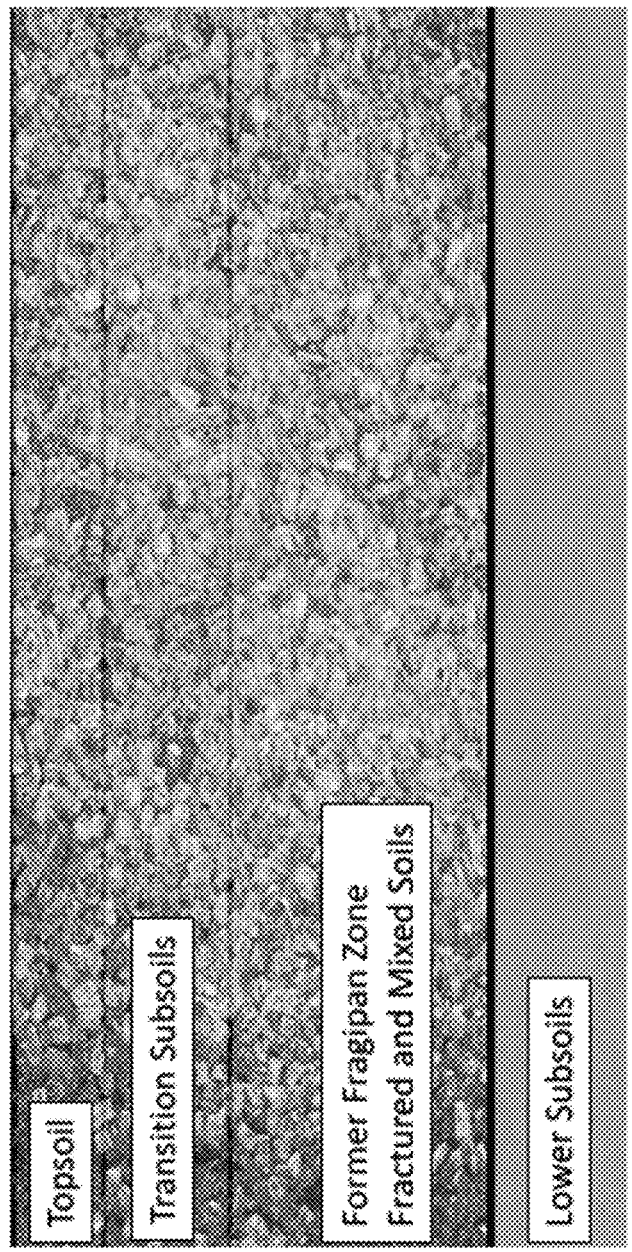
FIG. 15 (post-reaction fracture mix)

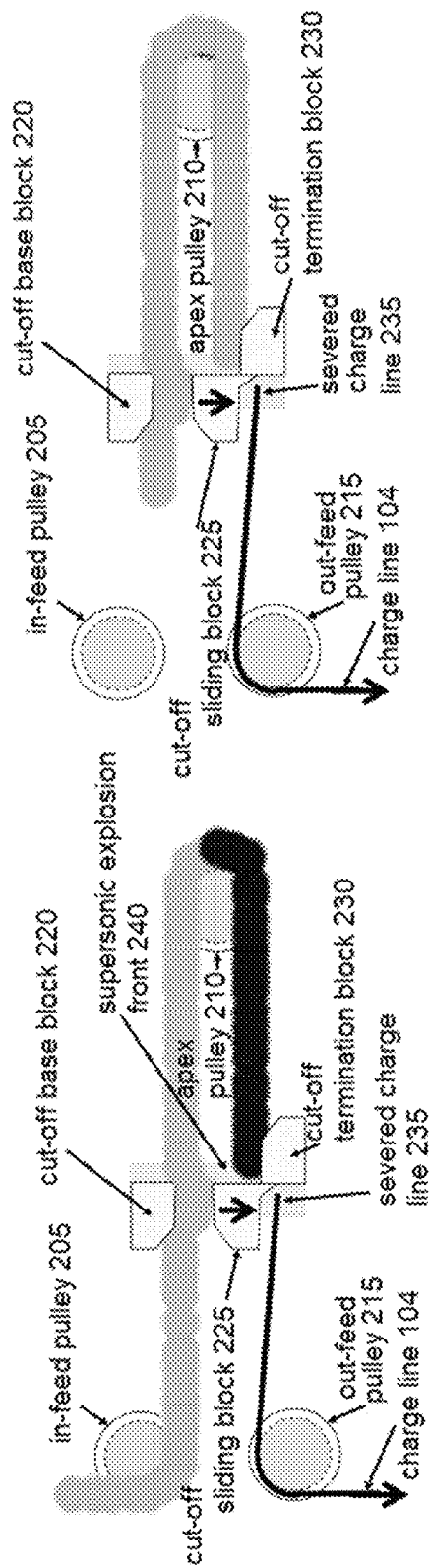

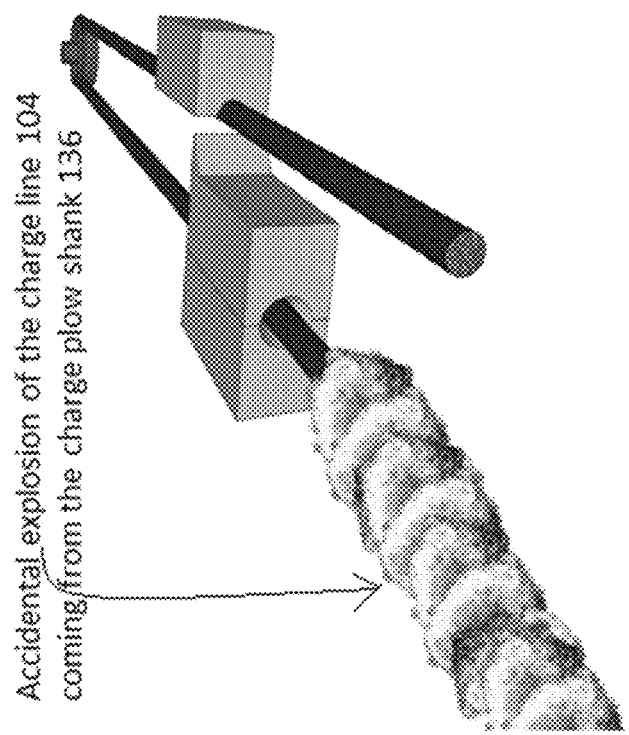
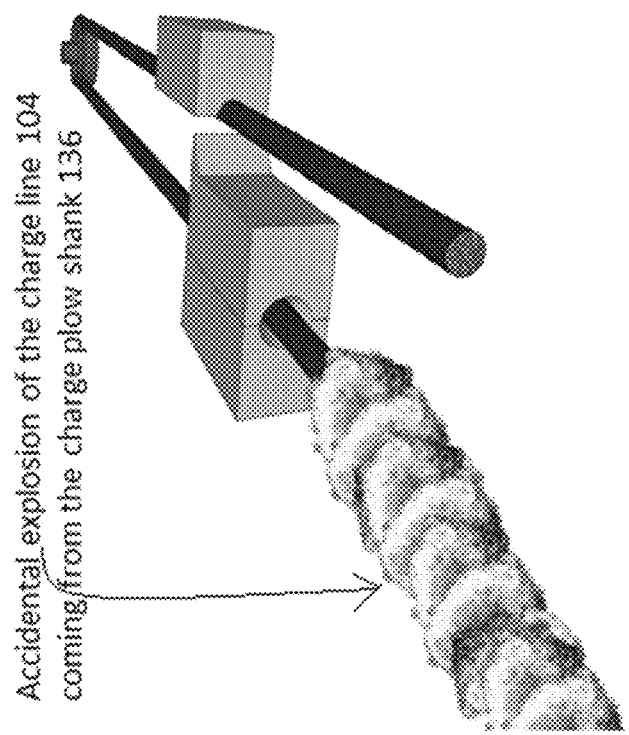
FIG. 19B
FIG. 19A

The explosion runs back via the charge line 104 to and through the cut-off 120 which propels (by the shockwave) the sliding block cutter toward the incoming charge line 104 span.

The shockwave pushes the sliding blade block to cut through the charge line 104 which terminates the reaction safely before the reaction reaches the spool 128

| fitting a CAP 108 with a charge application blade configured to apply a de-cementing compound mixture 164 into the subsurface shank 136 head cavity, or charge line cavity 140 left in the wake of the shank 136 as it passes through the soil; |
|---|

| depositing de-cementing compound 164 mixture in the void 140 along with the dispensed charge line/tube 104; |
|---|

| affixing a supply hose to a de-cementing compound supply connection 160 portion of the charge application blade thereby allowing the de-cementing compound mixture 164 to be pumped into and through the charge channel 138 assembly into the subsurface shank 136 head cavity 140 at a metered rate; |
|---|

| advancing the tow vehicle 112 and engaging the vibration mechanism or blade vibration assembly 134; |
|---|

| lowering the blades 137 to a desired depth; |
|---|

| vibrating the blades 137 through the soil; |
|---|

| rolling off charge line 104 into the soil; |
|---|

| pumping the de-cementing compound mixture 164 into and through the charge channel 138 into the subsurface head cavity 140 at a metered rate to correspond to the application's target area of treatment influence; |
|---|

| initiating and detonating the charge line 104; |
|---|

| sending a shockwave into the restrictive soil zone; |
|---|

| shattering the cemented features and fracturing the soil particles and driving the de-cementing compound mixture 164 into the targeted formations; and |
|---|

| mixing the de-cementing compound mixture 164 particles within the targeted soil formations thereby chemically altering the formerly restrictive soil barriers to prevent re-cementing. |
|---|

FIG. 22

AGRICULTURE SYSTEM AND METHOD

BACKGROUND OF THE INVENTION

Soil fragipan zones are formed by a naturally occurring chemical process which creates a cement-like layer in the soil. These restrictive soil layers, which are collectively referred to herein as fragipan but which also includes hardpan, durapan, or other natural and/or artificial soil compaction barriers. In relation to national agriculture impact, fragipans are more common to the Eastern to mid US regions, and hardpans are more nationally distributed with the San Joaquin Valley in California, which by itself contains over a half million acres with this cemented subsoil restriction. Fragipans can range from a few inches to a few feet in thickness and are typically located between one to four feet below the ground surface.

In the United States alone, about 50 million acres of land have been determined to be impacted by this agricultural restriction. In Kentucky alone, 2.7 million acres are known to have this fragipan layer in the soil.

It is possible that as much as 190 million acres of USA lands are subject to the limitations associated with fragipan. Since the United States comprises approximately 11% of the world's known arable land resources and it is well established that other countries have similar fragipan related agricultural limitations, it can be estimated that fragipan presence may impact several billion acres of cultivatable land worldwide.

The presence of such fragipan impedes agricultural productivity. Consequently, a system and method for impacting fragipan is desired.

BRIEF DESCRIPTION OF THE DRAWINGS

FIGS. 1, 2, and 3 show an embodiment of a system.
FIG. 4 shows another embodiment of a system.
FIGS. 7 and 8A are views of various elements of an articulating shank.
FIG. 9 (Prior Art) shows a profile view of untreated soil.
FIGS. 10, 11, 12, 13A, 13B, 14, and 15 show profile views of the soil during an application of the system.
FIGS. 18A, 18B, 18C, 18D, 18E, 18F, and 18G show details of a cutoff mechanism.
FIGS. 19A, 19B, 19C, 19D, and 19E show views of operation of a cutoff mechanism.
FIGS. 20-22 are flowcharts showing various usages of the system.

CONTEXT AND OBJECTS OF THE INVENTION

Figure 5A:
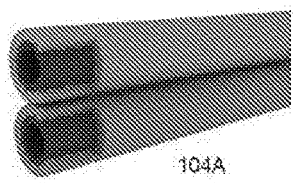
FIG. 5A shows an embodiment of a charge line.
Figure 5D:
FIG. 5D shows an embodiment of a charge line.
Figure 5B:
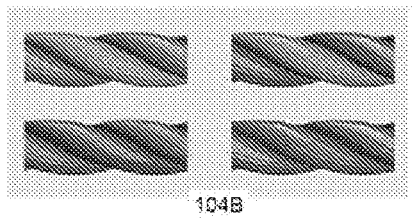
FIG. 5B shows an embodiment of a charge line.
Figure 5E:
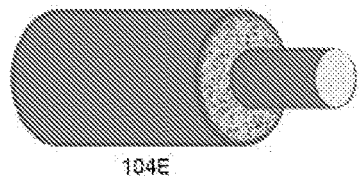
FIG. 5E shows an embodiment of a charge line.
Figure 5C:
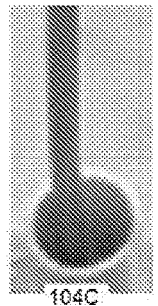
FIG. 5C shows an embodiment of a charge line.
Figure 5F:
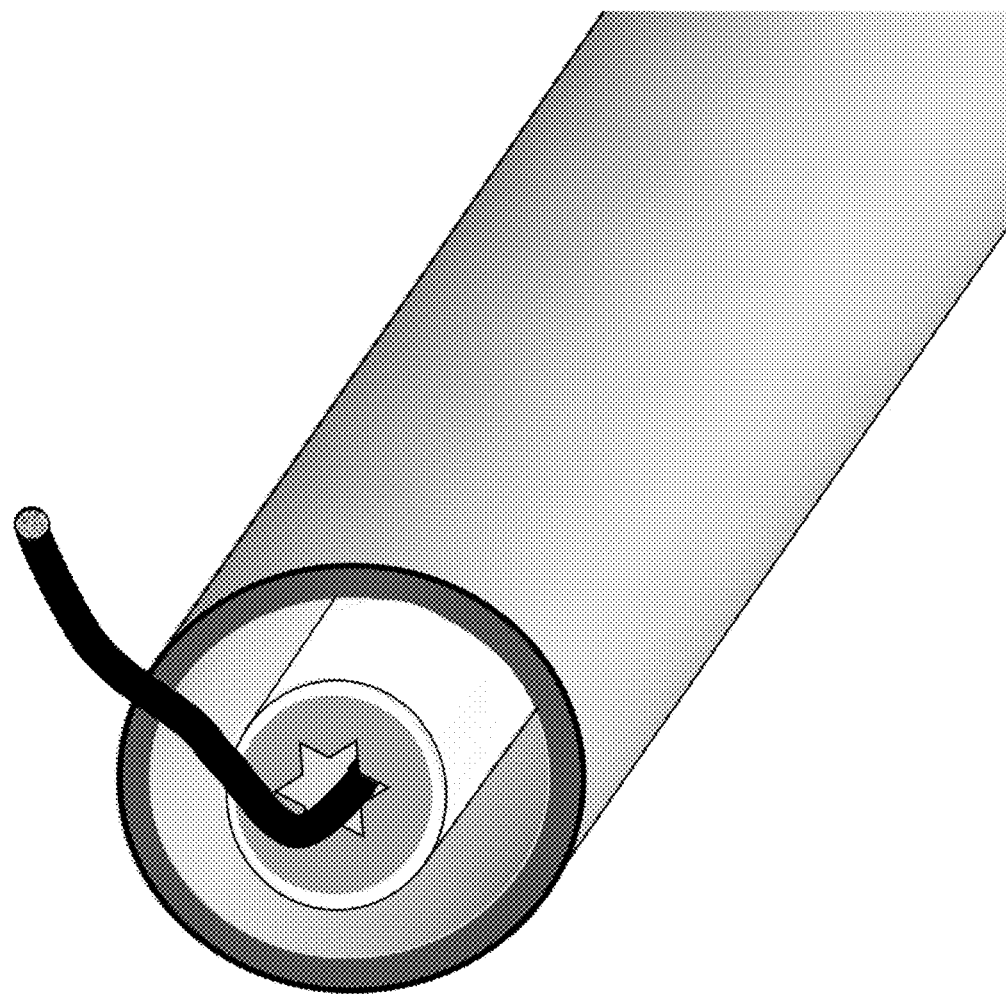
FIG. 5F shows an embodiment of a charge line.

The embodiments disclosed herein provide a system and collection of methods and apparatus which treat soil fragipan, hardpan, or other natural and/or artificial soil compaction barriers and allow the land to reach its maximum agricultural productivity.

The mining industry realized long ago that material handling via heavy equipment alone cannot compete with the efficiencies offered by explosives. Conversely, the agricultural industry moves soil by heavy equipment alone and has not benefited by use of explosives. The embodiments disclosed herein comprise technology which brings an explosively efficient solution to the problem presented by soil fragipan, hardpan, or other natural and/or artificial soil compaction barriers which have presented a persistent and on-going problem to agricultural efficiency by preventing crop root and/or water penetration.

The soil treatment disclosed herein shatters and fractures the fragipan, hardpan, and/or other compacted and cementaceous structures within the soil profile. The impact of this treatment is instantaneous and immediately provides for deeper root and water penetration into and through the formerly restrictive zones. This soil profile influence corresponds to greater crop yields or other increased agricultural production capacity including forage, biomass, forestry, fruits, and/or vegetables.

Another benefit of this invention is that it supports carbon sequestration because it delivers a feasible option for afforestation in arid regions, by fracturing the restrictive soil zone barriers which prevent plant roots from being able to reach the life sustaining moisture. The proposed technology has the potential to impact the reforestation of lands that formerly sustained forests, but cannot be economically reestablished because of the seedling mortality losses that the restrictive soil layers present to vertical root growth. Conversely, from an afforestation perspective, the same restrictions present a barrier to newly established tree growth from being able to reach the deeper soil moisture resources, which, in essence, may mean the difference between life and death to the afforestation effort being attempted. Likewise, the proposed technology has the potential to impact hydrologic cycles and provide for more rapid recharge and conservation of water resources; whereas, the restrictive layers often subject the precipitation to run-off or evaporation instead of allowing the valuable resource to be preserved and utilized to support vegetation and replenish the aquifers.

The embodiments disclosed herein also anticipate that the controlled explosives discussed herein will likewise prove to be far more energy efficient for the agricultural purpose of displacing and subtly repositioning more tons of soil per unit of energy input than the conventional alternative of trying to till these deeper soils with tractors or other types of heavy, diesel-powered equipment.

The embodiments disclosed herein achieve the fracturing and displacement of restrictive soil horizons, in an example, using a flexible linear explosive and/or energetic product (hereinafter referred to as a "charge line" and sometimes "charge line\tube"). The charge line is dispensed via an integrated sub-soiling farm implement which spools the charge line into furrows and uses the detonation of a series of one or more of these sub-surfacely installed charge lines to lift, loosen, and reposition the proximity soils and to break and breach the natural fragipan/compaction zone limitations. This approach dramatically increases the agricultural productivity of soils and improves groundwater flow and field drainage issues.

In one embodiment of the methods disclosed herein, an environmentally secure explosive substance known to exist is utilized. Specifically, Pentaerythritol Tetranitrate (PETN) is a powerful secondary explosive compound and has one of the lowest toxicity profiles of all explosive compounds and is highly biodegradable. As arguably the most "green" of the various commercial and military high explosives, PETN is an ideal choice for the embodiments herein, especially when used on soil profiles that support crops which will be used for food.

In conventional contexts, the explosive compound is converted into a high volume of gases which are predominantly comprised of nitrogen. However, in the event of a misfire, residual explosive materials remaining in the subsurface soils, which is a serious concern. Conversely, the embodiments disclosed herein benefit from environmentally friendly explosive compounds and blasting agents.

Likewise, in another embodiment, a proprietary blasting agent referred to herein as "ANBO" or Ammonium Nitrate and Bio Oil blend is implemented. ANBO brings a safe and cost effective blasting agent for the breaching of fragipan zones and the task of loosening soils to a degree that is economically and logistically beyond the capacity of diesel fuel driven equipment. The soil loosening effect of this treatment is also advantageous to the crop or plant growing process.

The methods disclosed herein also utilize a series of smaller muffled explosions which are rapidly absorbed by the target soils. The absence of solid rock, and the smaller shot system, combine to reduce the net vibration and airblast impact of this treatment to very minimal levels and often most neighbors would not notice the treatment during normal conditions at average distances.

The embodiments disclosed herein comprise a system for explosively and/or energetically breaching or otherwise overcoming the limitations commonly associated with fragipans, hardpans, or other compaction zones, naturally occurring or man-made, within a soil profile whereas the cementaceous properties of these restrictive barriers restrict root growth and water penetration into soils.

DETAILED DESCRIPTION OF THE PREFERRED EMBODIMENTS

FIGS. 1-4 show an embodiment of a system 100. The system 100 includes a charge line 104, charge application plow (CAP) 108, tow vehicle 112, GPS/GIS systems/antennas 116, cut offs 120, blast shield 124, charge line spool 128, routing pulleys 132, shank(s) 136 (or shank assemblies 136), and a charge line cavity 140. The system 100 further comprises blade-mounted sensors 150, and a systems monitor 151. Within this disclosure, there are instances where the charge line 104 may or may not be in the form of a tube, and thus referred to as charge tube 104, or charge line\tube 104.

Within FIG. 1, the shanks 136 are not shown in the ground. Within FIG. 12, the shanks 136 are shown lowered into the ground.

Within FIGS. 1-3, the tow vehicle 112 is shown as a tractor, being but one example of a rubber tire vehicle. Within the embodiments described herein, a non-tractor rubber-tire vehicle could also be used for the tow vehicle 112. For example, the embodiment of the system 100 shown in FIG. 4 has many similarities to that shown in FIG. 1, except that in FIG. 4, the tow vehicle 112 is a dozer rather than a tractor, and a blade-lift assembly 133 and blade vibration assembly 134 are included.

The CAP 108 installs active explosive compounds such as 1) charge line 104L, which is usually pre-prepared explosive compounds or 2) charge tube 104T, which is a flexible hose like conduit which is pumped full of charge after it has been installed in the subsurface.

The CAP 108 can be carried via hydraulic lift, or a wheeled version may also be towed by a tractor or other powered vehicle such as a dozer or other tracked or wheeled device. The CAP 108 comprises a subsoiling implement frame with one or more shank(s) or rippers 136, one or more on-board (or towed plow segments) with spools 128 of charge line 104 or subcomponents thereof, and an emergency cutoff device 120 for terminating an accidental detonation before the propagation of the explosion reaches the charge line spool(s) 128.

The CAP 108 may be equipped with a mechanism for activating binary explosive or other such reactive compounds at the point of field application or subsurface installation. For instance, a high-pressure nozzle could be used to inject an activating fluid into and through a fabric jacket on a charge line to activate the binary explosive at the point of field application or subsurface installation. This is particularly strategic to have a safe ammonium nitrate charge line that is activated into a binary explosive blasting agent on the unit at the point of being implanted in the soil. This implementation would be advantageous because any accidental explosion would extinguish itself after progressing back to the point of injection, and thus terminate the reaction without bringing harm to the operator or others in the vicinity.

In another variation, an articulating version of the CAP 108 may be utilized where the shank assembly 136 is mounted on the front section and the charge line spools 128, blasting agent hoppers, cutoff units, and/or the components of the CAP 108 may be divided between the front and rear sections of the tow vehicle 112. Such an arrangement distributes the load evenly and allow tighter turns at the end of each row of crops being farmed. As such, the implementation shown at least within FIGS. 1-4 is for example only, and should not be considered as limiting.

An important goal of the embodiments disclosed herein is to match the explosive solution to the fragipan problem. This is because there can be many variations in the soil being treated. These variations can include but are not limited to physical and geological factors. Physical factors include depth, thickness, and hardness of the fragipan, consistency of soil profile, and normal soil moisture conditions. Geological factors include structure, resilience, strength, density, and velocity of energy transmission.

To achieve proper matching, the embodiments disclosed herein utilize enhanced GPS systems to allow the CAP's precise position to be recorded and managed by an on-board computer system which will utilize Geographical Information System (GIS) technology to map the position and extent of the treatment activities and, in other embodiments, provide for a towing vehicle and the CAP 108 to be autonomously operated, and/or automatically computer operated with or without a human pilot on the tow vehicle 112. Likewise, this GPS/GIS system will provide for mapping existing features such as subsurface utilities and/or tiling or other features to assure that the CAP 108 does not engage or accidentally damage these structures.

The embodiments disclosed herein can also be equipped with instruments to sense, sample, test, or measure the depth and thickness of the fragipan and/or the hardness thereof. These instruments can include ground penetrating radar, pulse induction detectors, or other such devices to sense underground objects or voids, such as drain tiles to allow for these devices to be preserved and not damaged by the field treatment process.

The CAP 108 may also be equipped with one or more accidental blast shielding mechanisms, either spool shielded, or tow vehicle mounted, which would deflect the energy of an accidental detonation away from the operator or other potential bystanders.

As stated, the system may be equipped with instruments to sense, sample, test, or measure the depth and thickness of the fragipan and/or the hardness thereof. For instance, the system 100 may incorporate the use of multichannel analysis of surface wave method (MASW) instrumentation aboard the tractor or towing unit vehicle or CAP 108 as a means of determining the fragipan depth and thickness. This in turn would result in adjusting a depth of the shank 136 depth, either manually or automatic given the actual soil conditions. Likewise, the system 100 may be equipped with ground penetrating radar, pulse induction detectors, or other such devices to sense underground objects or voids, such as drain tiles to allow for these devices to be preserved and not damaged by the field treatment processes and methods disclosed herein.

Returning to FIGS. 1, 2, and 4, each shank 136 is designed to feed in a charge line to the soil's subsurface zone, and is equipped with a groove or cavity on the rearward facing edge of the shank assembly, or within the system 100. This arrangement allows the charge line, the charge tube, and a de-cementing agent or other such explosive materials, to be fed into the subsurface.

Each shank 136 can be configured to be pulled through the soil solely by the power of the towing unit or assisted via a hydraulic, pneumatic or electric device which is incorporated to provide vibration to the shank 136 and thus allow it to slice through the soil with significantly less towing horsepower.

The spools 128 or spool assemblies 128 may be equipped with pay-out and/or take-up devices which may be hydraulic, pneumatic or electric device powered to reel up or reel out the charge line. A mechanism (not shown) may be used to sense the ground speed and match the power spooling action to the speed of the CAP 108.

The assemblies for the shank(s) 136 may be equipped with hydraulic, pneumatic or electric device/s powered to retract each shank 136 independently. This would enable partial rows to be treatable. The spool assemblies 128 may be equipped with distributor bars, tension and/or slack sensors to make sure the charge line does not get too loose or too tight, thereby preventing breakage or tangling of the charge line 104.

The CAP 108 may be equipped with a mechanical apparatus to create charge line from subcomponents during the applications. For instance, an on-board braiding machine may be added to the CAP 108 to allow more than one charge line 104 to be joined (via on-board braiding) prior to field application or subsurface installation. Likewise, an on-board extruder or sealer may be utilized to join cords/lines, blasting agent, just prior to field application or subsurface installation whereas the charge application plow assembly may be equipped with a hopper or bin of blasting agent or other such components to be fed into the charge line 104 prior to field application or subsurface installation.

The shanks 136 are designed to, among other things, disengage, raise, and/or retract, in case a boulder, rock, or other solid object encountered by the shank 136. This disengagement may be triggered by a spring or other such device that allows the shank 136 to remain in service and not disengage for normal ranges of resistance. To achieve this, the disengagement mechanism can be set to certain limits of torque or tension to trigger disengagement of the position of the shank 136.

Each shank 136 is designed to feed in a charge line\tube 104 to the soil's subsurface and is equipped with a groove or cavity on the rearward facing edge of the shank system 136 which allows the charge line 104, detonating cord, or other such linear flexible explosive materials to be fed into the subsurface.

Each shank 136 can be configured to be pulled through the soil solely by the power of the tow vehicle 112. However, in an embodiment, a hydraulic, pneumatic or electric device can also be incorporated to provide vibration to the shank 136 to allow it to slice through the soil with less towing horsepower. A straight shank 136 can be utilized, or an articulating shank 136 can be used which provides for a hinged tail section to be added to allow the tow vehicle 112 to make tighter corners. Likewise, a mechanically powered version of the shank 136 is suitable for cutting through the soil, thereby using less towing horsepower.

The spool assemblies 128 may be equipped with pay-out and/or take up devices which may be hydraulic, pneumatic or electric device powered to reel up or reel out the charge line\tube 104. A mechanism may be used to sense the ground speed and match the power spooling action to the speed of the CAP 108. The spool assemblies 128 may be equipped with distributor bars, tension and/or slack sensors, or other resources, to make sure the charge line does not get too loose or too tight to prevent breakage or tangling of the charge line.

The CAP 108 may be equipped with a mechanical apparatus to create charge line from subcomponents during their application, i.e. "on the fly". For instance, an on-board braiding machine may be added to the CAP 108 to allow more than one charge line 104 to be joined, prior to field application or subsurface installation. Likewise, an on-board extruder or sealer may be utilized to join cords/lines, blasting agent, etc. just prior to field application or subsurface installation. In an embodiment, the CAP assembly 108 may also be equipped with a hopper or bin of blasting agent or other such components to be fed into the charge line prior to field application or subsurface installation.

The CAP 108 may be equipped with a mechanism for activating binary explosive or reactive compounds at the point of field application or subsurface installation. For instance, a high pressure nozzle could be used to inject an activating fluid into and through a fabric jacket on a charge line to activate the binary explosive at the point of field application or subsurface installation.

FIGS. 5A-5F shows various configurations of the cables and braiding for the charge line 104. The charge line 104 is a flexible conduit filled with explosive and/or energetic compounds. This conduit 104 may be comprised of a fabric and or a synthetic membrane/plastic consisting of an explosive and/or energetic or blasting agent blend of materials in several configurations including but not limited to:

- single component charge line (see e.g. charge lines 104A in FIG. 5A), in which a reloaded and pre-sensitized explosive compound is located within a linear flexible conduit;
- braided charge line (comprising multiple single component charge lines) (see e.g. charge lines 104B, 104D in FIGS. 5B and 5D);
- line-in-line charge line—One or more line(s) within a line consisting of priming mechanism or line and a blasting agent. These would be pre-activated, field-activated, or field-assembled or loaded and fused into a charge line at the point of application.

The invention's explosive or energetic compounds are applied into and through the charge plow as one of five forms (collectively referred to herein as either as "charge line" 104 or "charge tube" 104, or charge line\tube 104). The charge line 104 was discussed earlier, but the charge tube embodiment includes is made by installation of an empty tube, hose or other such conduit and pumping an explosive compound and/or blasting agent into and through said charge tube after it has been installed in the subsurface soil zone.

Within the drawings, it is not possible or necessary to show a charge line differently than a charge tube, so there will be instances in this disclosure where the charge line\tube 104 is referred to generally. However, in instances where only a charge line (not tube) is referred to, that will be referred to as 104L. Similarly, if only a charge tube (not line) is being referred to, that will be 104T. For accuracy, sometimes the tube is referred to as a conduit.

Usages of a charge tube 104T can include but are not limited to the following three embodiments:

Multi-component or binary charge line (post-insertion)—A conduit which is preloaded with a blasting agent compound which is sensitized post insertion by pumping a liquid sensitization compound into and/or through the linear flexible conduit filled with an oxidizer and/or blasting agent.

Multi-Component or binary charge line (at-insertion)—A conduit which is loaded with a blasting agent compound which is sensitized during the assembly and insertion process by pumping a liquid sensitization compound into the oxidizer and/or blasting agent, then sealing the linear flexible conduit shell prior to subsurface insertion.

Bulk charge agent—Free product explosive compound and/or sensitized blasting agent which flows or is pumped into and through a charge conduit tube 104T in the charge plow into a void space created by the lower structural configuration of the charge plow blade as it passes through the soil.

The charge line\tube 104 can have at least the following variations and characteristics.

single detonating cord; >=1 detonating cords braided or wrapped;

binary explosive compounds in a flexible spool conduit form;

one detonating cord with two ammonium nitrate sensitized cords;

one detonating cord with two ammonium nitrate field sensitized cords;

detonating cord encapsulated within a flexible tube or conduit;

primer cord within flexible tube of blasting agent;

detonating cord within an empty tube which is plow-applied and pumped full of blasting agent and/or an explosive compound or a mixture thereof;

implement-mounted brighter for affixing explosive and blasting agent flexible explosive conduits;

use of binary explosive compound of liquid crushable within oxidizer conduit;

use of binary explosive compound within tubes rolling cords or extruded plastic substrates;

use of braided detonating cord (multiple braided);

use of compound detonating cord (cord within cord or "core-loaded");

use of >=1 detonating cords braided with >=1 cords or tubes of pre-sensitized agent;

use of >=1 detonating cords braided with one or more cords or tubes of live application sensitized blasting agent;

use of detonating cord(s) and/or blasting agent cords in a pouch pipe configuration;

use of activated explosive compound within >=1 internal conduits and/or blasting agent and/or oxidizer conduits in a pouch pipe configuration;

use of detonating cord(s) within an empty applied conduit, which is field filled with explosive compound and therein activated;

use of row by row activation and/or a series of rows being solely and/or sequence activated to limit vibration or air blast impact of the application;

use of field activated binary explosive consisting of a core load activator solution within an inner conduit within an outer conduit containing an oxidizer compound;

use of binary explosive compound of liquid crushable within oxidizer conduit;

use of binary explosive compounds in a flexible spool conduit form;

use of detonating cord within an empty tube, which is plow applied and pumped full of blasting agent and/or an explosive compound or a mixture thereof;

use of primer cord with in flexible tube of blasting agent;

use of one or more detonating cord/s encapsulated within a flexible tube or conduit;

use of one detonating cord with two ammonium nitrate field sensitized cords;

use of one detonating cord with one or more ammonium nitrate sensitized cords or conduits braided;

use of detonators within the body or exterior conduit wall of the charge line;

use of wireless detonators within the charge line's body or exterior conduit wall; and/or use of a shot tube which consists of a small tube packed full of a secondary explosive that has the purpose of uniformly detonating the charge line's load of blasting agent.

Figure 6:
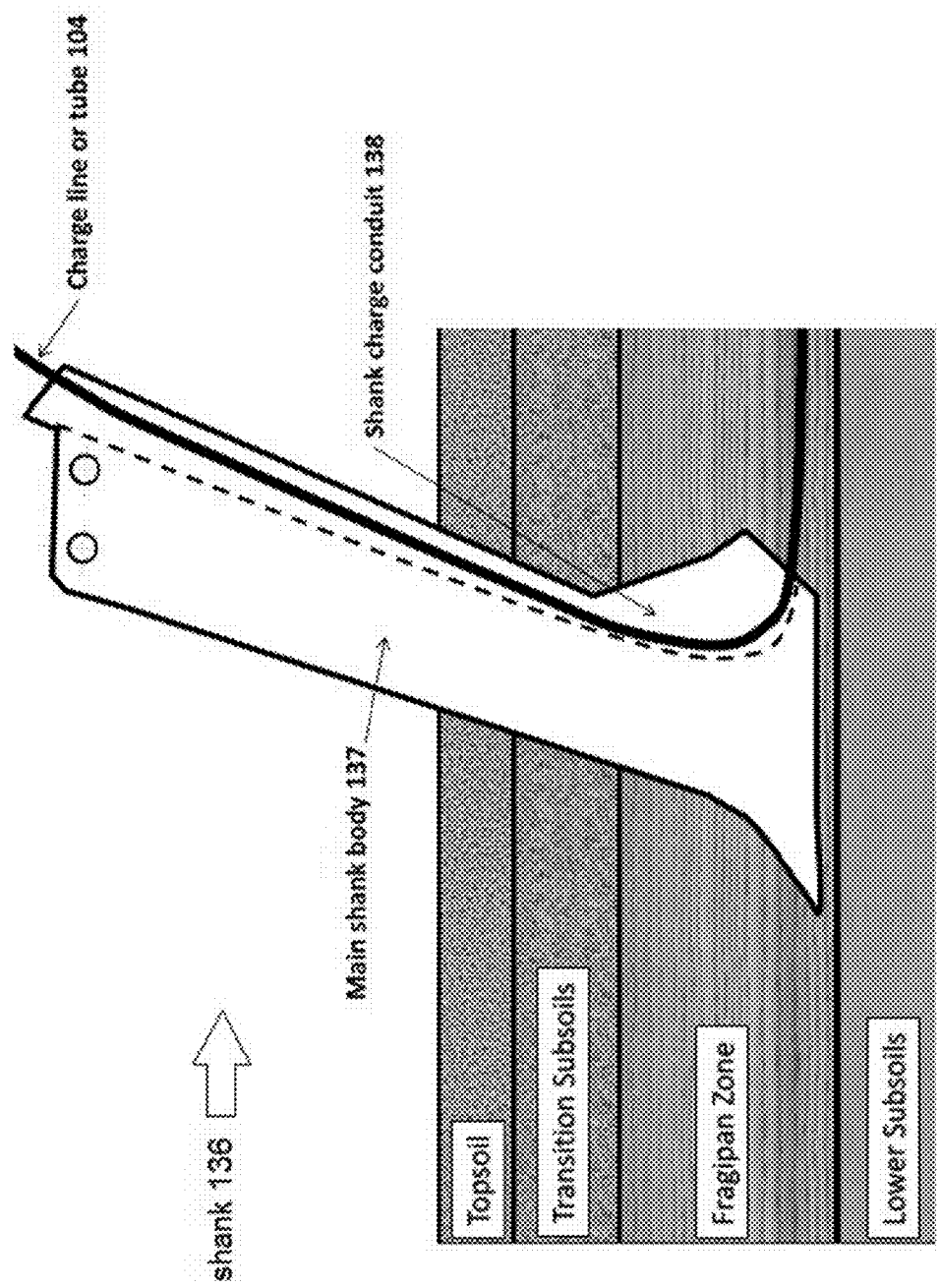
FIG. 6 shows a profile view of various elements of a shank.

FIG. 6 shows a profile view of various elements of a solid body shank 136.

Figure 7:
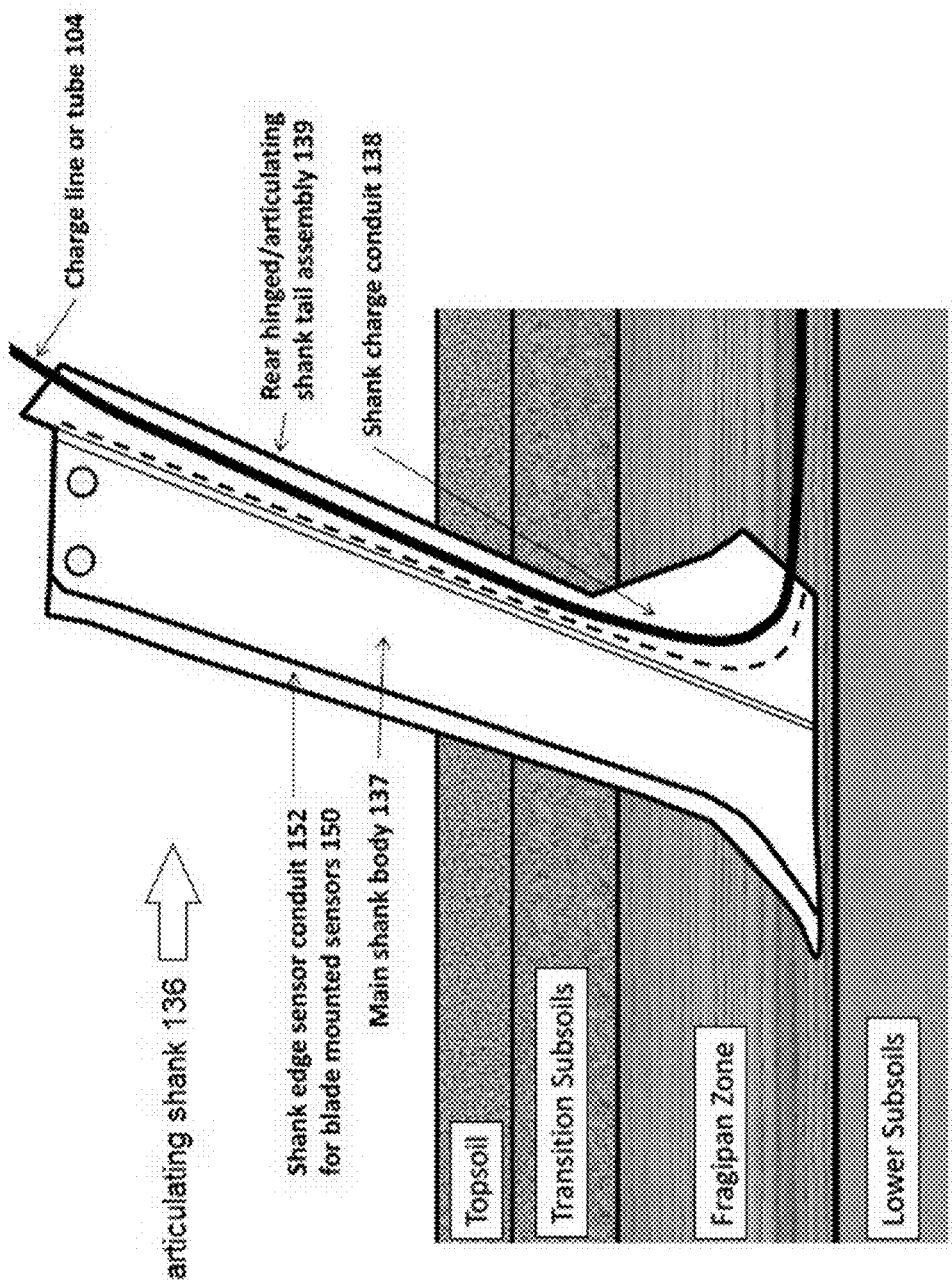

FIG. 7 and FIG. 8A show profile views of various elements of an articulating shank 136. The embodiment shown in FIG. 8A contains equipment for performing a decementing process.

Figure 8B:
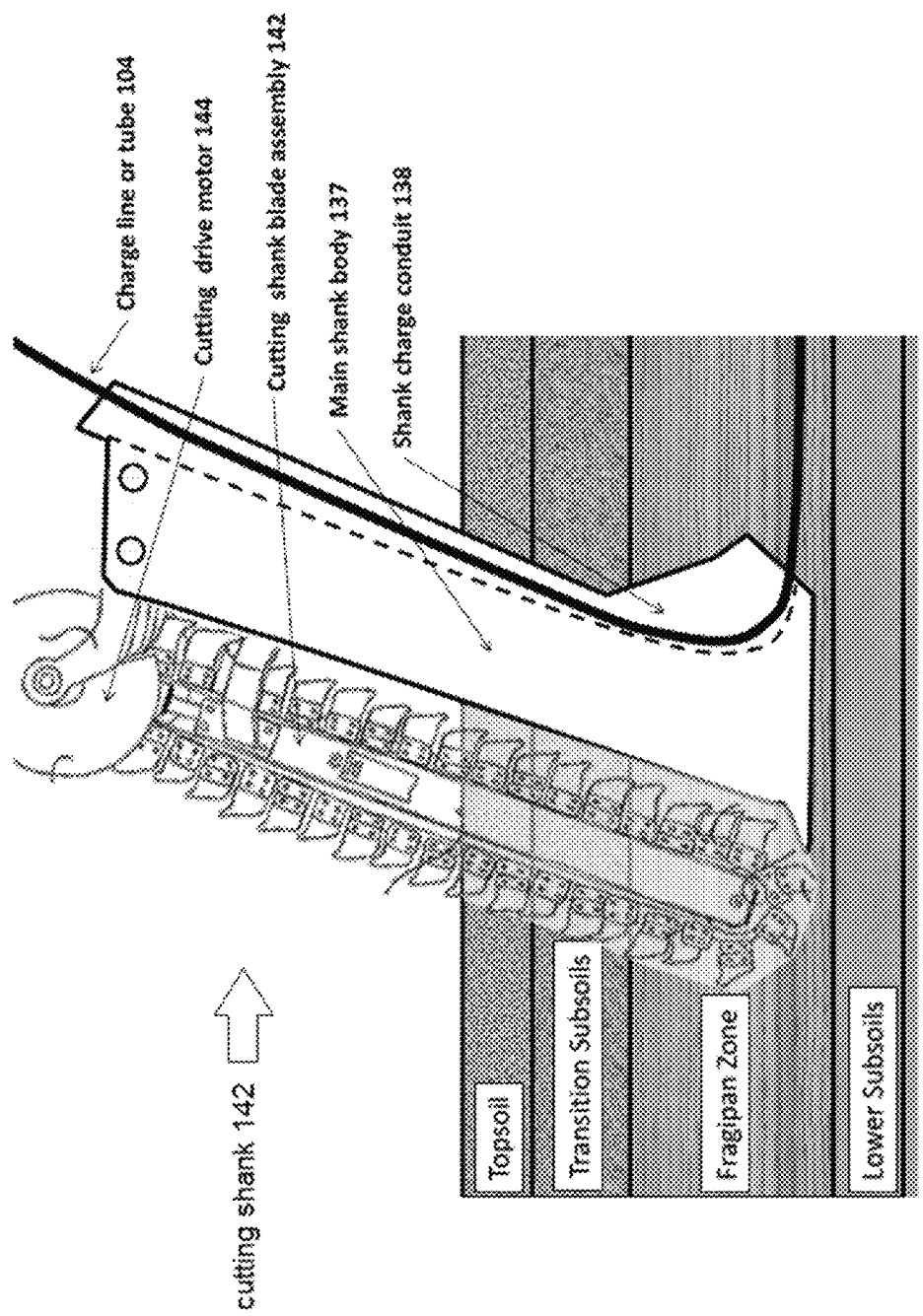
FIG. 8B shows a profile view of various elements of a cutting shank.
Figure 16A:
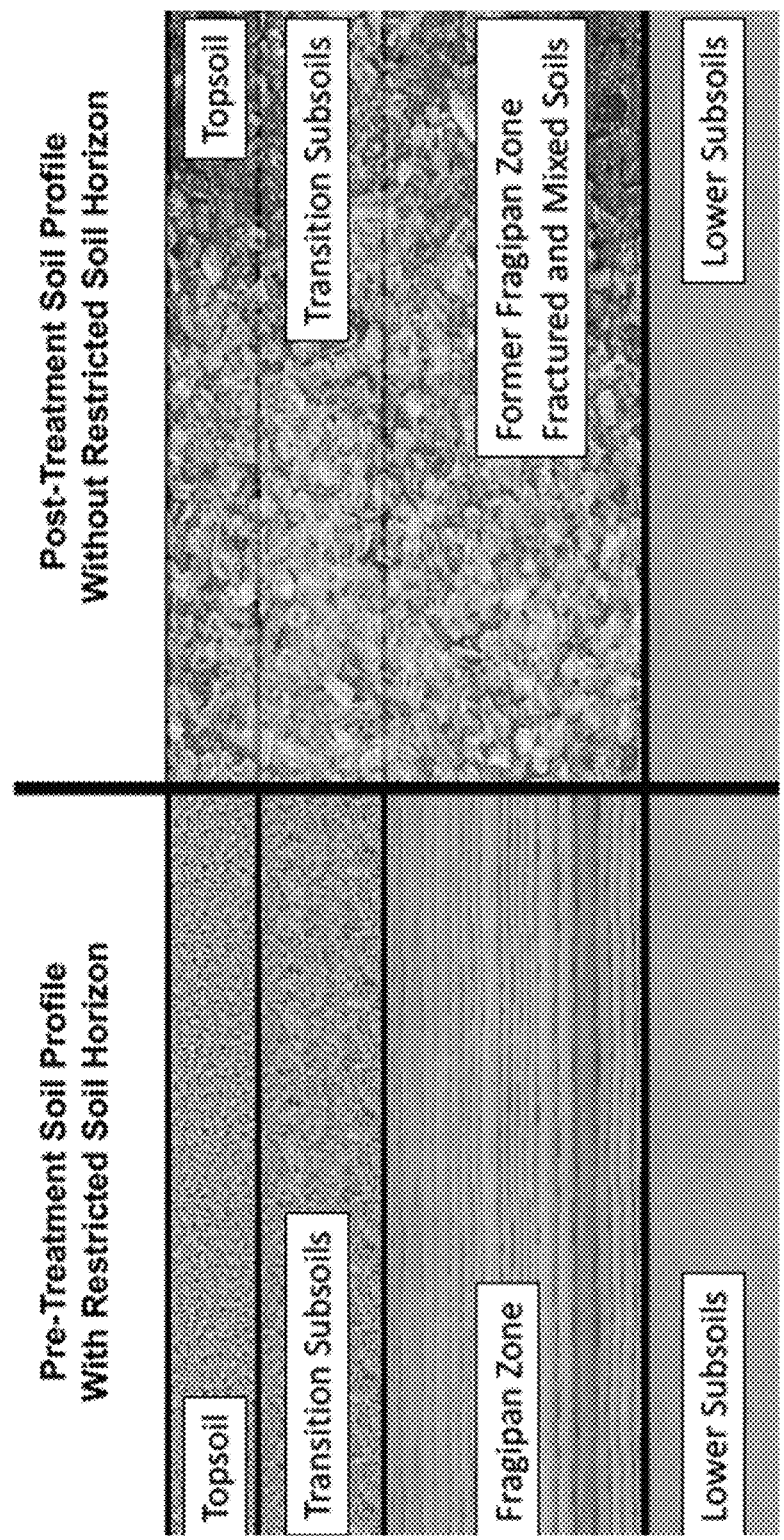
FIGS. 16A and 16B shown before-after comparisons.
Figure 16B:
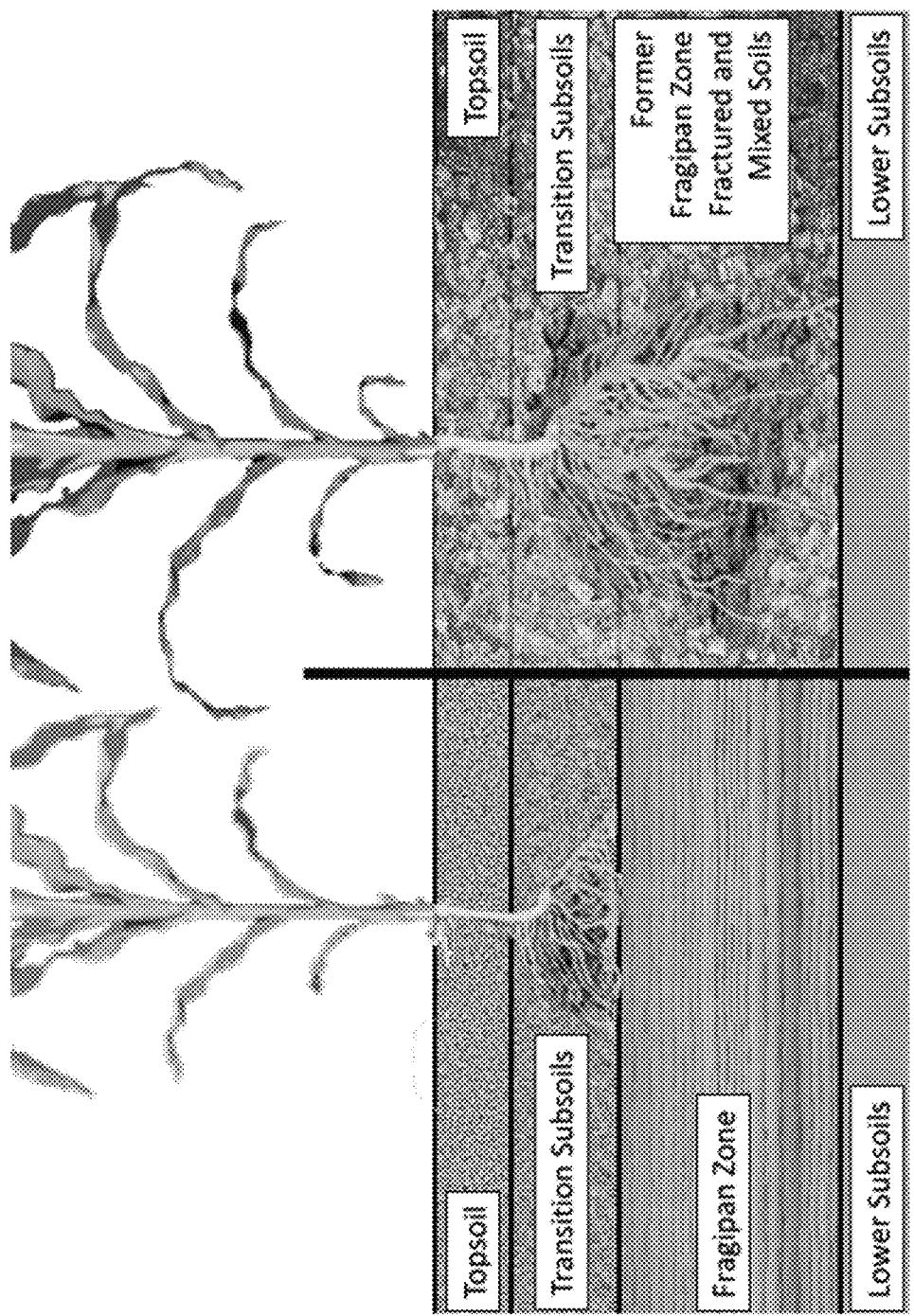

FIG. 8B shows a profile view of various elements of a cutting shank 136.

FIG. 9 (Prior Art) shows a profile view of untreated soil.

FIGS. 10-15 show profile views of the steps in applying the system 100, and how the soil profile changes after each stage of application. Prior to explaining each of these steps, some context is provided first.

FIGS. 10-15 illustrate the steps in explosively and/or energetically breaching or otherwise overcoming the limitations commonly associated with fragipans, hardpans, or other compaction zones, naturally occurring or man-made, within a soil profile whereas the cementaceous properties of these restrictive barriers restrict root growth and water penetration into soils. Another way to say it, FIGS. 10-15 illustrate the steps in applying an explosive charge selected to overcome the natural resistance of the fragipan, hardpan, and other compaction zones in the soil profile to provide lift and lateral dispersement of the explosive reaction influence.

For example, the natural cementatious resistance of the fragipan zone creates a barrier to the gas release episode whereas the reaction's gas release back pressure mechanism provides lift (FIG. 14) to the fragipan zone. The shockwave (FIG. 13A-13B) acts upon this resistance of the fragipan and offers a shattering influence mostly to the structural composition of the fragipan.

The near-instantaneous gas release episode provides the movement to the shattered fragments of these structures and displaces, or loosens, these zones. Effectively, this shatters the fragipan, hardpan, and/or other compacted or cementaceous structures within the soil profile and allows deeper root and water penetration which collectively correspond to greater crop yields or other agricultural production including hay, forage, biomass, forestry, fruits, and/or vegetables.

The natural cementatious resistance of the fragipan zone creates a barrier to the gas release episode whereas the reaction's gas release back pressure mechanism provides lift to the fragipan zone. The shockwave acts upon the resistance of the fragipan and offers a shattering influence to the structural composition of the fragipan and the near-instantaneous gas release episode provides the movement to the shattered fragments of these structures and displaces, or loosens, these zones. The system 100 shatters the fragipan, hardpan, and/or other compacted or cementaceous structures within the soil profile and allows deeper root and water penetration which collectively correspond to greater crop yields or other agricultural production including hay, forage, biomass, forestry, fruits, and/or vegetables.

As stated, the amount of explosive compound and blasting agent employed in the present invention is impacted by the fragipan's depth, thickness, hardness, consistency of soil profile, and soil moisture conditions. Likewise, geological or geophysical soil features such as the soil's structure, resilience, strength, density, and its estimated velocity of energy transmission.

Using the system 100, a typical treatment scenario can comprise:

The charge applicator plow 108 uses a shank 136 to lay a charge line\tube 104 within, or in the proximity of the target fragipan layer (FIG. 10).

Specialized backfilling/tamping fins/wheels/discs are used on the CAP 108 to cover the buried charge line\tube 104, and serve to effectively seal the explosive charge's overlying furrow with native soils or stemming (FIG. 11).

Using a row-by-row or row group series initiation method, the charge line\tube 104 is detonated by the operator (FIG. 12).

As the detonation episode progresses rapidly, the resistance of the fragipan will influence a lateral expansion of the reaction and the shockwave impact will have a shattering influence upon the more solid objects in its path (FIG. 13A-13B).

Following the shock wave by only milliseconds, the rapidly expanding gas volume will provide moderate displacement and lift to the fragipan layer and overlying soils (FIG. 14). The soils rapidly absorb the shock wave influence because the volumes of explosives detonated per given millisecond of delays is so small, the vibration and air blast of the reaction are translated into the muffling influence of the host zone soils.

As the lifted soils release the gas volumes, the soils settle back rapidly with little net displacement, but a significant and uniform net loosening influence (FIG. 15). The system has thus fractured, displaced, loosened, and lifted the fragipan and other overlying soil layers. With the present invention's influence of a breached fragipan, plant roots and moisture are free to migrate to deeper soil horizons where plants can benefit from additional moisture and nutrients that were previously inaccessible.

FIGS. 16A, 16B, 17, 18A, 18B, 18C, 18D, 18E, 18F, and 18G show before-after comparisons conveying the value of the system 100. These Figures show some important considerations. For example, in a post-treatment context, the restrictive soil layer (e.g. fragipan, hardpan, or durapan) has been fractured and the overlying soils are lightly mixed depending upon the lifting force of the charge. The decementing compound that is pumped into the subsurface, along with the driving charge line or tube, is blown by the force of the detonation into the fragipan and mixed with the fragipan to prevent the re-cementing of the layer. Thus the pre-treatment line of distinction between the overlying soil layers and the restrictive zone is often not as visible as what is shown herein. Often there is a color difference visible when an excavation is made, but this is not always the case. The distinction of a fragipan is more of a cemented soils versus uncemented soils issue. As such, the clear transitions in various Figures showing what is fragipan and what is not fragipan is included for illustration only, not meant to be taken literally, and should not be considered as limiting.

Figure 17:
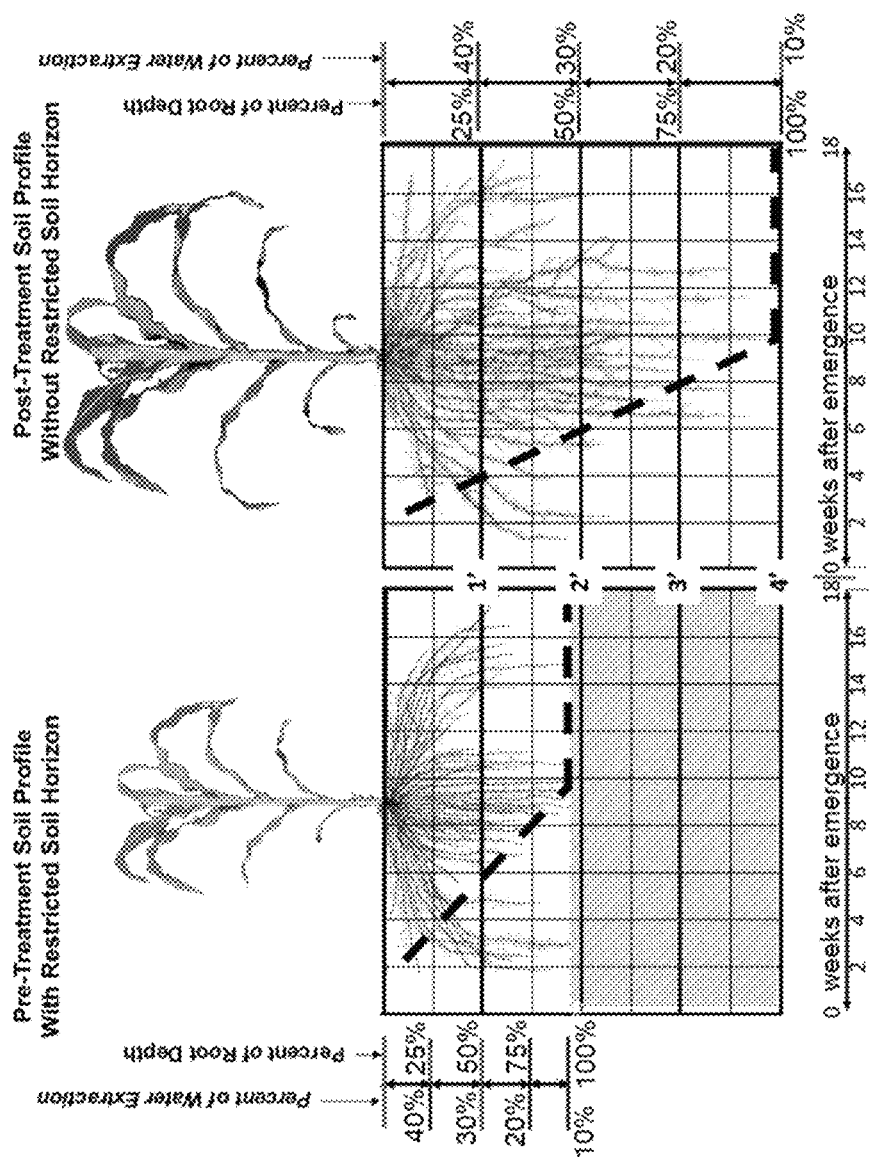
FIG. 17 show progress and timing of root-growth and plant-growth, plotted along a time-lined mapped out in week-by-week staging.
Figure 18B:
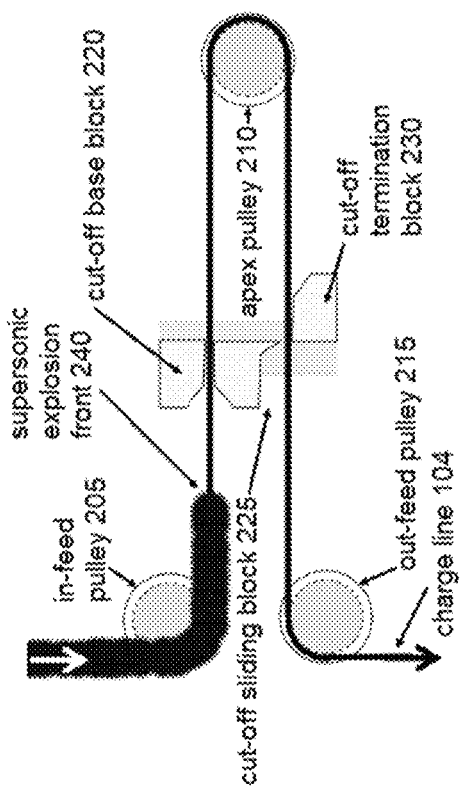
Figure 18A:
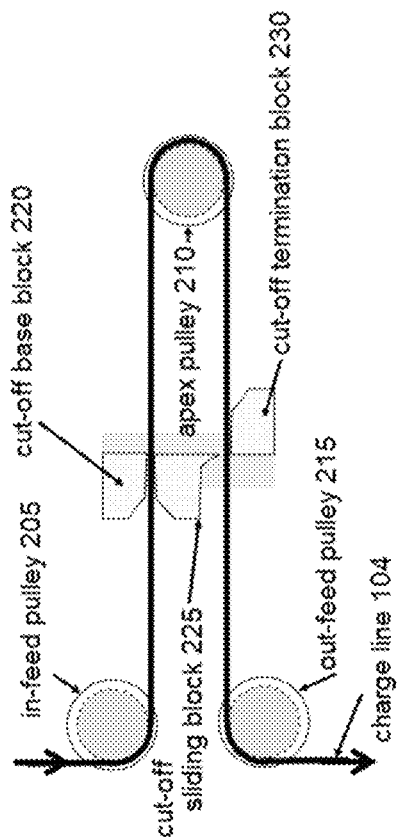
Figures 18C, 18D:
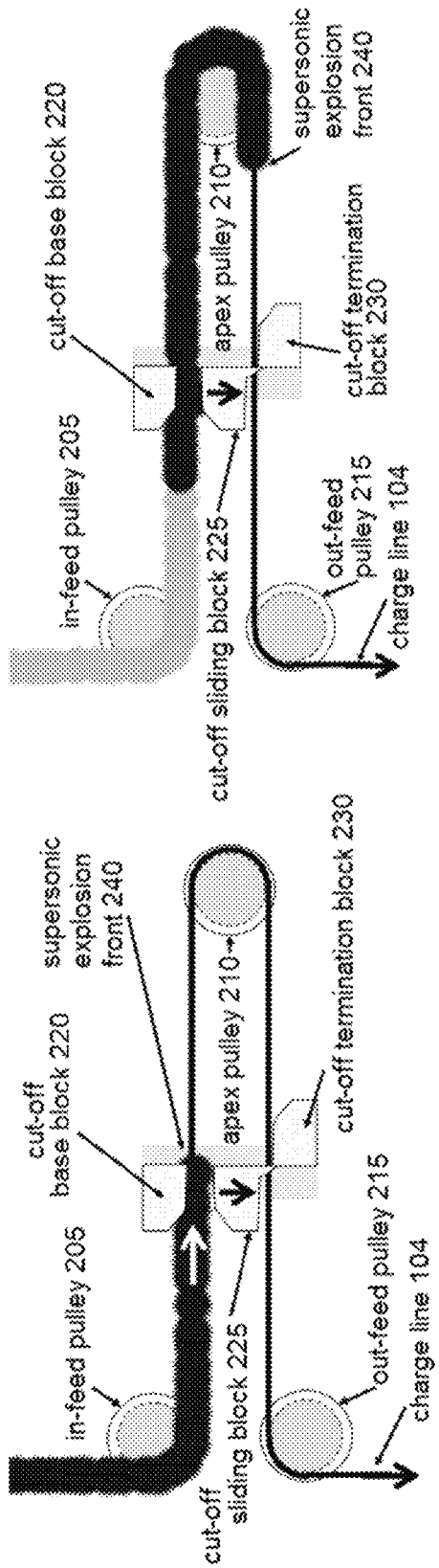
Figure 18G:
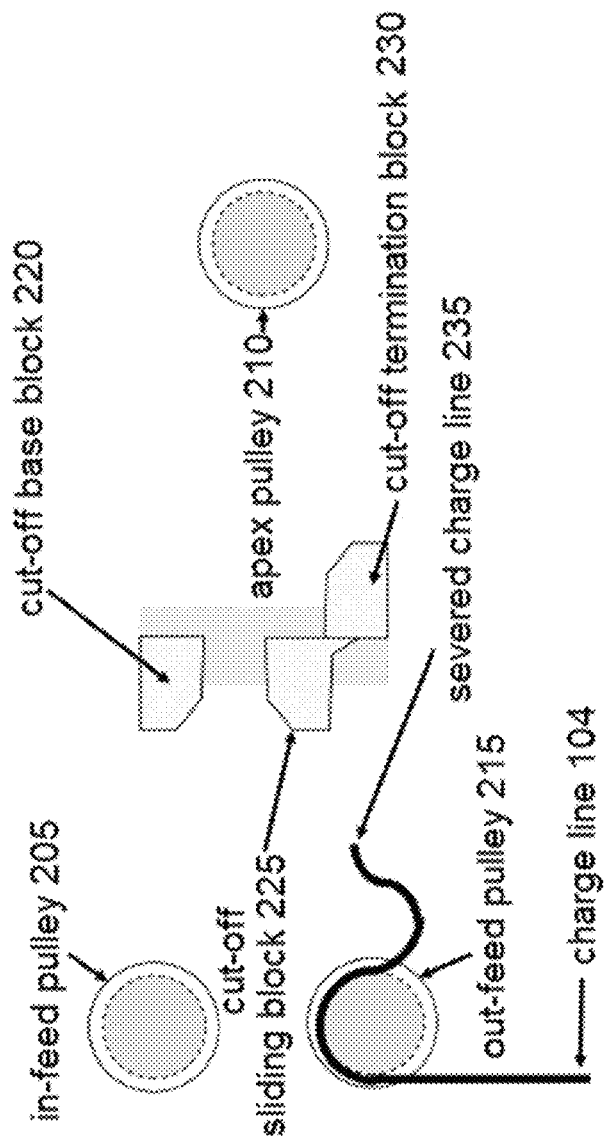
Figure 19C:
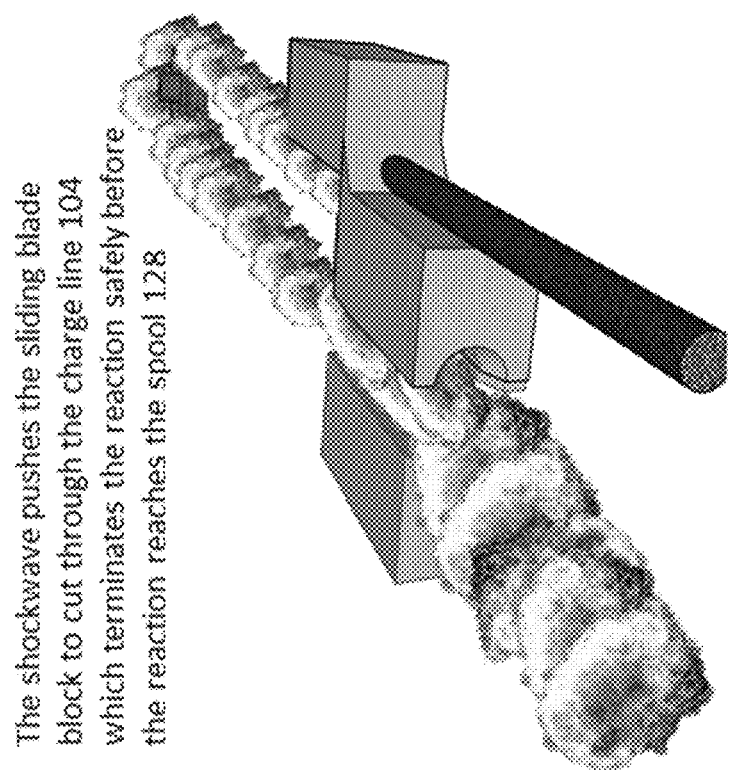
Figure 19D:
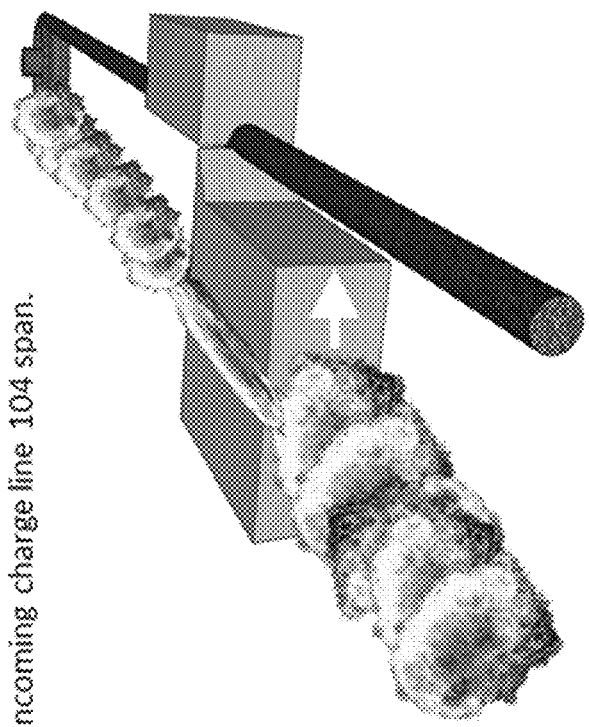
Figure 19E:
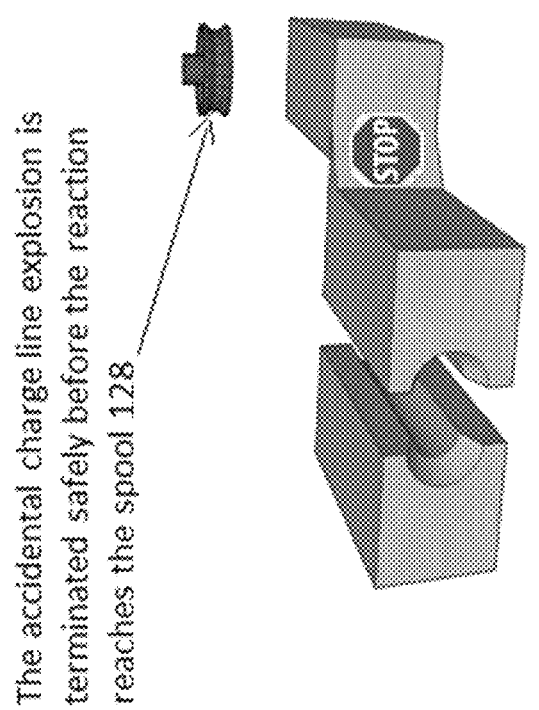

FIG. 17 shows progress and timing of root-growth and plant-growth, plotted along a time-lined mapped out in week-by-week staging.

Decementation

Soil cementation is generally regarded to be due to excess cation mineral concentrations and are usually composed of silicon, aluminum, manganese, or iron hydroxide precipitates with the soil profile which bind the soil particles with a cement-like consistency. A certain amount of color change will be visible after treatment because of the mixing that takes place where the horizon's meet, but the real distinction that is value added is the fractured particles that will not reconstitute and recement themselves together over time as rainfall penetration would tend to re-activate the chemical processes within the fragipan that caused it to form originally.

For areas with these recementing characteristics, the treatment process includes the addition of a decementing compound which can be 1) pumped into the plow point void or cavity directly along with the inserted charge line or tube, 2) encapsulated in a separate conduit to be lain or inserted along with the charge line or tube by the charge application plow 108, or 3) mixed with the explosive compound in a common conduit to be inserted by the charge application plow 108.

From an ongoing treatment aspect, the invention's aqueous decementing solutions, with high SSR mixtures, are blasted into the target formation and the adjacent overlying soils and are later driven by precipitation to penetrate faster into the fractured fragipan capillaries which will thus generate the critical swelling pressure and shearing stress required to rupture the fragipan into even smaller fragments while chemically counteracting the cationic component tendency of the fragments to re-cement themselves.

The decementing compound can be: 1) pumped into the charge application plow point void or cavity directly along with the inserted charge line or tube, 2) encapsulated in a separate conduit to be lain or inserted along with the charge line or tube by the plow, or 3) mixed with the explosive compound in a common conduit to be inserted by the plow.

The decementing compound can be one or more of the following substances including sodium nitrate, potassium chloride, potassium sulfate, sodium fluoride, sodium-hexametaphosphate, calcium fluoride, and other sodium or magnesium based-compounds which have high sodium soluble ratio (SSR) characteristics. Likewise, certain natural substances such as ryegrass extract, humus, manure, and/or aerobically digested biosolid waste (ADB) can be added to the decementing compound to offer similar decementation influences.

Application rates for the decementing compound depend upon the soil cementing characteristics to be overcome as well as the particular decementing compound mixture chosen and the thickness of the fragipan to be treated. Typically, the application rate may involve between 100 lbs to as much as 1 ton per acre treated (i.e: sodium nitrate at 750 lbs/acre for typical Western Kentucky Zanesville Soil Series.)

The aqueous decementing solutions, with high SSR mixtures, are blasted into the target formation and the adjacent overlying soils and are later driven by precipitation to penetrate faster into the fractured fragipan capillaries which will thus generate the critical swelling pressure and shearing stress required to rupture the fragipan into even smaller fragments while chemically counteracting the cationic component tendency of the fragments to recement themselves. The mixing effect offered by this invention is far superior and comparatively much more efficient than other more conventional mixing methods such as trying to plow-in these decementing additives using a deep sub-soiler or dozer-mounted ripper.

Specific Explosives

Regarding the specific explosives used e.g. within the charge line\tube 104, any of the following components and/or other explosive or energetic ingredients and/or binary components would be suitable for the purpose of explosively breaching a fragipan or other compacted and/or cemented soil structure/zone/horizon:

Example Explosives Used within System 100 (e.g. Ammonium Nitrate and Fuel)

"Fuel" as that word is used in this disclosure may be used somewhat outside of its conventional meaning. Fuel can for example comprise the following: fuel oil, bio oil, diesel, biodiesel, vegetable oil and other organic oils, vinegar, and/or other fuel to oxidizer blends which create a blasting agent, and can also be one or more of 300 mesh aluminum powder or smaller particle size. Also zinc, titanium, copper, tin, magnesium, cobalt, and/or nickel.

ANFO (94% ammonium nitrate+6% fuel oil); and ammonium nitrate based emulsions.

PETN or Pentaerythritol tetranitrate for charge line and small primer charges.

Other Example Explosives

Nitroguanidine; Trinitrotoluene (TNT); Tritonal (80% TNT+20% aluminium); Nitrourea, Diethylene glycol dinitrate (DEGDN); Nitromethane (NM); Nitrocellulose; Hexogen (RDX); Erythritol tetranitrate (ETN); Octogen (HMX); Nitrostarch; Black powder; Hexamine dinitrate (HDN); Dinitrobenzene (DNB); HMTD (hexamine peroxide); Tovex® Extra (AN water gel) commercial product; TATP (acetone peroxide); Hydromite® 600 (AN water emulsion) commercial product; ANNMAL (66% AN+25% NM+5% Al+3% C+1% TETA); Amatol (50% TNT+50% AN); Nitroguanidine; Trinitrotoluene (TNT); Tritonal (80% TNT+20% aluminium); Nitrourea; Hexanitrostilbene (HNS); PBXW-126 (22% NTO, 20% RDX, 20% AP, 26% Al, 12% PU's system); Nitromethane (NM); Nitrocellulose (13.5% N, NC; AKA guncotton); Amatol (80% TNT+20% AN); Triaminotrinitrobenzene (TATB); PBXN-109 (64% RDX, 20% Al, 16% HTPB's system); PBXIH-135 EB (42% HMX, 33% Al, 25% PCP-TMETN's system); Trinitrobenzene (TNB) 1.60 7300 1.20; Tetrytol (70% tetryl+30% TNT); Picric acid (TNP); Tetryl; Nitrostarch; Black powder; Nobel's Dynamite (75% NG+23% diatomite) 1.48 7200 1.25; Torpex (aka HBX, 41% RDX+40% TNT+18% Al+1% wax); Pentolite (56% PETN+44% TNT); Composition C-3 (78% RDX); Composition B (63% RDX+36% TNT+1% wax); Composition C-4 (91% RDX); Semtex 1A (76% PETN+6% RDX); RISAL P (50% IPN+28% RDX+15% Al+4% Mg+1% Zr+2% NC); Hydrazine mononitrate; Mixture: 30% nitrobenzene+70% nitrogen tetroxide; Mixture: 24% nitrobenzene+76% TNM; Octol (80% HMX+19% TNT+1% DNT); Nitroglycerin (NG); Plastics Gel® (in toothpaste tube: 45% PETN+45% NG+5% DEGDN+4% NC); PBXW-11 (96% HMX, 1% HyTemp, 3% DOA); NTO (Nitrotriazolon); Hexogen (RDX); Erythritol tetranitrate (ETN); DADNE (1,1-diamino-2,2-dinitroethene, FOX-7); Composition A-5 (98% RDX+2% stearic acid); Chopin's Composition (10% PETN+15% RDX+72% ETN); Ballistite (92% NG+7% nitrocellulose); Penthrite (PETN); Ethylene glycol dinitrate (EGDN); TNAZ (trinitroazetidine); Octogen (HMX grade B); HNIW (CL-20); Hexanitrobenzene (HNB); (AFX-757); MEDINA (Methylene dinitroamine); DDF (4,4'-Dinitro-3,3'-diazenofuroxan); AFX-777; PAX-28; Octanitrocubane (ONC); Heptanitrocubane (HNC).

Example Methods of Using the System 100

Charge Line

Starting with an example of a charge line method, a property to be treated is assessed, surveyed, and application is customized to site and soil conditions.

Application parameters are entered into system computer (i.e. depth and thickness of restrictive soil zone target as well as the estimated load of the charge for treatment).

The charge line spool 128 is loaded onto the charge application plow 108, secured into position, and the charge line 104L is guided through the through the plow's arrangement of routing pulleys 132, including the cut-off assembly 120 into and through the shank 136 charge channel 138.

As the tow vehicle 112 begins moving the shank vibration mechanism, or blade vibration assembly 134, is engaged and the blade, or shanks 136 are lowered by the blade lift assembly 133 to the desired depth as the shank blades vibrate through the soil and the charge line 104L is rolled off, or dispensed, from the spool 128, through the plow's arrangement of routing pulleys 132, including the cut-off assembly 120 into and through the charge channel 138 into the subsurface void, or the charge line cavity 140 created by the shank 136.

The charge line 104L is laid at a prescribed depth within the restrictive formation or just below it.

When the desired span of charge line 104L is laid, the charge line 104L is severed from the remaining quantity on the spool 128.

An operator attaches a detonator to the charge line 104L, covers the exposed surface portion of the charge line 104L with loose soil, attaches the detonator to the firing mechanism, and initiates the charge line 104L.

The charge line 104L detonates and a shockwave travels into the restrictive soil zone shattering the cemented features and fracturing the soil particles.

The detonation's gas release episode lifts and loosens the overlying soils and moves and mixes them slightly as the expanded gases vent themselves upward.

The treated soils settle back into position, but are much looser and broken and the formerly restrictive soil zone is fractured and will now allow roots to penetrate through it and will allow water to drain lower into the soil column to be stored for supporting plant life.

Figure 20:
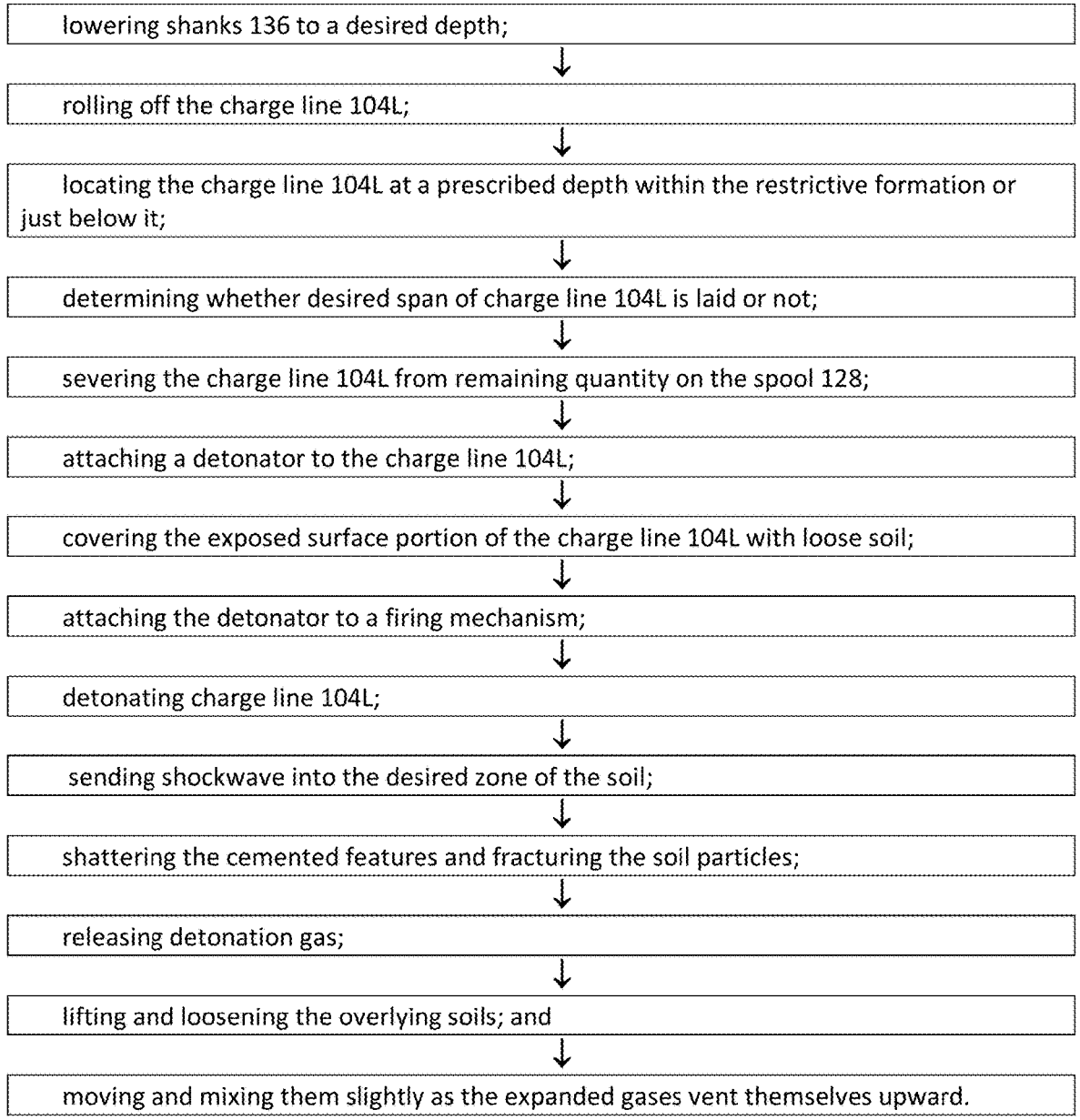

These steps can be achieved in a variety of orders and sequences, so that the above are for example only. A summary/overview of these steps is included in FIG. 20.

Charge Tube

Moving on to an example of a charge tube method, a property to be treated is assessed, surveyed, and application is customized to site and soil conditions.

Application parameters are entered into system computer (i.e. depth and thickness of restrictive soil zone target as well as the estimated load of the charge for treatment).

The charge tube spool 128 is loaded onto the charge application plow 108, secured into position, and the charge tube 104T is guided through the routing pulleys 132 and into the shank 136 charge channel 138. A plug is inserted into the end of the charge tube 104 and sealed.

As the tow vehicle 112 begins moving the charge application plow's 108 shank 136 vibration mechanism, or blade vibration assembly 134, is engaged and the blade or shanks 136 are lowered by the blade lift assembly 133 to the desired depth as the blades of the shank 136 vibrate through the soil and the charge tube 104 is rolled off, or dispensed, from the spool 128, through the plow's arrangement of routing pulleys 132, into and through the charge channel 138 into the subsurface void, or charge line cavity 140, created by the shank 136.

The charge tube 104T is laid at a prescribed depth within the restrictive formation or just below it. When the desired span of charge tube 104T is laid, the charge tube 104T is severed from the remaining quantity on the spool 128.

An operator attaches a charge filling hose connection, or charge emulsion supply connection 175, which is connected from the charge emulsion mixture supply 170 to one or both ends of the charge tube 104 and actives a pump which fills the subsurface charge tube 104 with the charge emulsion mixture supply 170.

When filled, the charge tube 104 ends are plugged and sealed.

A detonator is attached or affixed to the loaded charge tube 104.

The exposed surface portion of the charge tube 104 is covered with loose soil.

One or more detonators are connected to the firing mechanism; and the loaded charge tube 104 is initiated.

The loaded charge tube 104 detonates and a shockwave travels into the restrictive soil zone shattering the cemented features and fracturing the soil particles.

Figure 21:
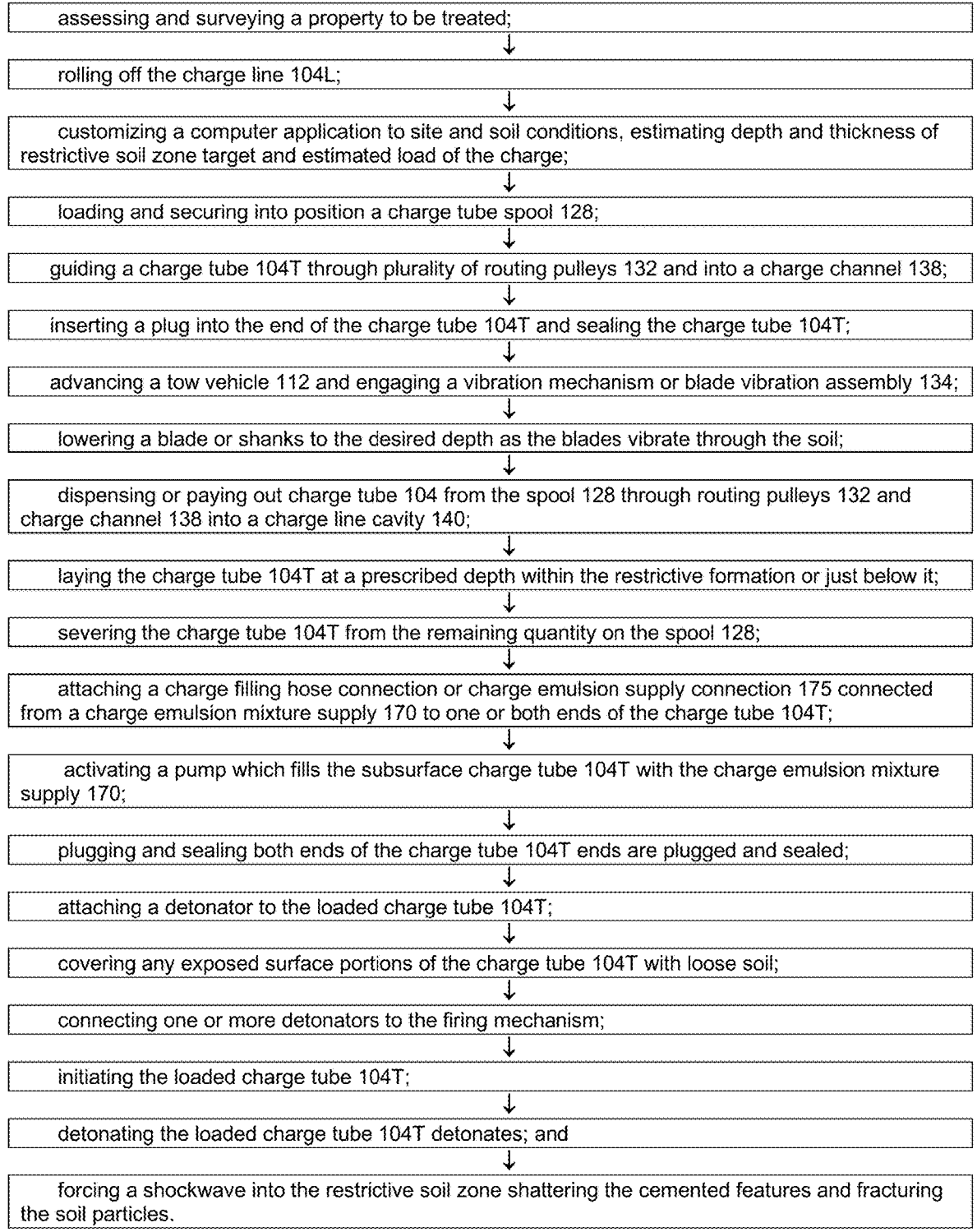

These steps can be achieved in a variety of orders and sequences, so that the above are for example only. A summary/overview of these steps is included in FIG. 21.

De-Cementing

A final method example will be a de-cementing method, in which the charge application plow 108 is fitted with a charge application blade that is specially configured (FIG. 8A) to apply a de-cementing compound mixture 164 into the subsurface shank 136 head cavity, or charge line cavity 140, which is left in the wake of the shank 136 as it passes through the soil leaving the de-cementing compound 164 mixture in the void 140 along with the dispensed charge line\tube 104.

A supply hose is affixed to the de-cementing compound supply connection 160 portion of the charge application blade which allows the de-cementing compound mixture 164 to be pumped into and through the charge channel 138 assembly into the subsurface shank 136 head cavity 140 at a metered rate to correspond to the application's target area of treatment influence.

As the tow vehicle 112 begins moving the charge application plow's 108 shank 136 blade/s 136 into the soil, the shank 136 vibration mechanism, or blade vibration assembly 134, is engaged and the blade/s 137 are lowered to the desired depth as the shank 136 blades 137 vibrate through the soil and the charge tube is rolled off, or dispensed, the de-cementing compound mixture 164 is pumped into and through the charge channel 138 into the subsurface head cavity 140 at a metered rate to correspond to the application's target area of treatment influence created by the shank 136.

Once installed, the charge is initiated and when the charge tube 104 or charge line 104 detonates, a shockwave travels into the restrictive soil zone shattering the cemented features and fracturing the soil particles with the de-cementing compound mixture 164 being forcefully driven and dispersed by the detonation into the targeted formations.

The de-cementing compound mixture 164 particles are mixed by the force of the detonation within the targeted soil formations chemically alters the formerly restrictive soil barriers to prevent them from re-cementing themselves in time and prevents subsequent re-constitution of these soil barriers.

These steps can be achieved in a variety of orders and sequences, so that the above are for example only. A summary/overview of these steps is included in FIG. 22.

Additional Features and Insights (Wrap-Up)

The system 100 can be applied at a lot of different times and seasons during the year, and (with limitations) can potentially be used year-round. On certain fields/crops/at certain windows of the season, the system 100 could be utilized even during crop time. For example, some spray rigs enter fields and spray during the crop growing process; although, certain losses do occur from crushing due to rig turn-arounds and operator error in staying in the span between the rows that cannot be avoided. As such, the farmers can weigh the benefit to be gained outweighs the losses from such application.

Next, rows of crops can be between 24" and 36" apart whereas most tractor tires or track treads can fit in between the wider rows. As such, the system 100 could be applied during a crop's growth phase (especially early in the season i.e.: seed stage, germination, seedling, etc) before roots penetrate to deeper stages of the soil column. The application timeframe thus extends all year, but most especially the timespan between post-harvest and pre-planting since this is most optimal for the system 100.

Using wireless detonators can also be a component of the system 100. The tow vehicle 112 can insert a wireless detonator that would be activated and armed post insertion, without stopping to tie in wires and caps before one would be able to initiate a detonation.

Ammonium nitrate is relatively inexpensive and works well for the purposes herein disclosed. Ammonium nitrate can be easily activated by almost any organic compound from diesel fuel to ground up wheat straw. Likewise, ammonium nitrate can be easily activated by almost any powdered metal substance such as aluminum or zinc. As such, within the mining and construction industry, ammonium nitrate is the standard blasting agent worldwide for these reasons.

The typical blasting agent, ANFO, is 90-95% ammonium nitrate (AN) and 4-10% fuel oil (FO) or diesel fuel. Another blasting agent could be ammonium nitrate based emulsion to use for pumping into empty charge tube which has been laid by the charge application plow 108 into the soil subsurface. This emulsion is an ammonium nitrate that has been oil-activated with a substance that keeps the ammonium nitrate particles, prill, or crystals coated to withstand the water that it is mixed with to be pumped like a liquid. For the embodiments disclosed herein, this emulsion only has to protect the oil-covered ammonium nitrate particles long enough to pump the emulsion and detonate it before the water begins to disintegrate the ammonium nitrate and render the compound no longer explosive.

For nomenclature purposes, ammonium nitrate is an oxidizer. When it is activated, or sensitized, it is then referred to as a blasting agent, which is an explosive but still takes a blasting cap (detonator) and/or primer charge to reliably detonate.

PETN is a respected standard in detonating cord and it would also be a foundational component for the charge line 104 described herein. For a preloaded, preactivated explosive compound which is made into a linear, rope-like type of explosive, PETN is a suitable choice. It is potentially the most biodegradable of all high explosive materials and has less toxicity than any other secondary explosive compound as well.

By contrast, TNT is toxic to touch, eat, and extremely toxic to manufacture. Many other high explosives, like HNS, share this concern, but not Pentaerythritol tetranitrate or PETN.

Within the system 100, PETN can act as a building block for charge line because it fires super reliably at smaller diameters and it moves rapidly at over 20,000 ft per second. Other explosives or ammonium nitrate can be mixed with or adjacent to PETN in assemblies of the charge line 104, and the PETN will overcome the performance problems that such other explosives or blasting agents would have without it. For a preloaded, pre-energized, high explosive charge line as is herein presented, PETN has very high utility.

Ammonium nitrate by itself is 100% plant available source of nitrogen. Although the explosive reaction completely uses up Ammonium nitrate or PETN, they are each as environmentally harmless as one can get. For explosive compounds which will be used this close to soil, (i.e. food), these two compounds (ammonium nitrate and PETN) are the safest to use for this unique application.

The remote radio caps are a more recent development and are considered to be state of the art for mining since the control system via radio sets each cap remotely and sets the timing and delay for each. In such an embodiment, the system 100 uses no wires or shock tubes. It is all accomplished with radio waves.

The shallow depth of the system 100 and the ability to slide a tablet-sized, remote cap into or upon the charge line or injected at intervals inside the stream of blasting agent slurry pumped into the charge tube provides an advantage over existing solutions. Additionally, the ability to remotely arm the caps and trigger them to go off at designed millisecond delays also provides an advantage for the system 100.

Disclaimer

In view of the preferred embodiments described above, it should be apparent to those skilled in the art that the present invention may be embodied in forms other than those specifically described herein without departing from the spirit or central characteristics of the invention. Thus, the specific embodiments described herein are to be considered as illustrative and by no means restrictive.

The above description is that of a preferred embodiment of the invention. Multiple modifications and variations are possible in light of the above teachings. It is therefore to be understood that, within the scope of the appended claims, the invention may be practiced otherwise than as specifically described. Any reference to claim elements in the singular, e.g. using the articles "a," "an," "the," or "said" is not construed as limiting the element to the singular.

Further, it is to be understood that the present invention is not limited to the embodiments described above, but encompasses any and all embodiments within the scope of the preceding claims. None of the above inventions and patents, taken either singly or in combination, is seen to describe the instant invention as claimed.

APPENDIX OF FURTHER FEATURES

First Set use of detonating cord in singular cord form;

use of multiple detonating cords braided together or otherwise joined in a singular charge line form;

use of line in line compound detonating cord whereas one or more smaller cords are configured inside a larger cord, conduit, tube, or flexible pipe or other such enclosure;

use of charge line configured with a smaller detonating cord within a larger cord, line, conduit, tube, or flexible pipe or other such enclosure with a quantity of blasting agent, explosive or energetic components contained therein;

use of charge line configured with preactivated live blasting agent, and/or explosive components and/or energetic components contained therein;

use of charge line configured with field-activated live blasting agent, and/or binary explosive components and/or energetic components contained therein whereas the charge line contains binary ingredients which are physically crushed or otherwise are chemically, mechanically, or electrically activated during the field installation phase of the treatment process wherein this inures to a safety benefit to the field installation or treatment personnel;

use of cut off devices to prevent propagation of larger aboveground explosions if the charge line were to detonate prematurely or accidentally whereas these cutoffs utilize the explosive force traveling through the charge line to:

A. force-propel a guillotine like device to cut off the charge line; and/or

B. trigger another explosion a guillotine like device to cut off the charge line before the progression of the explosion reaches the application system's explosive resources or spools of explosive materials.

Second Set producing a detonating cord by forming a mixture of cap-sensitive crystalline high explosive compound and a binding agent therefore into a continuous solid core;

drawing strands of yarn under tension sufficient to form a moving cage of substantially parallel longitudinal strands;

allowing the moving cage to entrain the core within it, whereby the cage becomes a conveyor for the core;

applying a layer of soft plastic material around the moving cage while effecting substantially no change in the diameter of the core after its entrainment within the cage; and hardening the plastic material.

The die is a tubular die and the plastic tube formed therein is collapsed onto the caged core unit by the drawing of a vacuum through the die.

The strands of yarn and the core are moved separately into an extrusion die wherein the strands are formed into the cage and entrain the core, and the plastic sheath forms around the caged core unit by passage of the caged core unit through a stream of plastic.

The mixture is formed into the solid core under vacuum.

The mixture is treated so as to exclude from the core particles larger than about 25% of the core diameter.

A wireless detonator assembly for use in connection with a blasting machine that transmits at least one wireless command signal to the wireless detonator assembly within the charge line.

A detonator comprising a shell and a base charge for actuation.

use of a state sensor to sense at least one environmental condition in an immediate vicinity of the wireless detonator assembly;

use of an activation/deactivation module to render the wireless detonator assembly capable of actuation in response to a command signal to fire when the at least one state sensor senses that the at least one environmental condition falls within pre-determined parameters suitable for blasting, the wireless detonator assembly otherwise maintaining a safe mode incapable of receiving and/or responding to a command signal to fire.

use of a command signal receiving and processing module comprises an RF receiver;

use of a firing circuit associated with the base charge, the base charge actuatable through application of a current through the firing circuit, the activation/deactivation module comprising a switch to open the firing circuit when the at least one state sensor senses that the at least one environmental conditions falls outside of the pre-determined parameters suitable for blasting, thereby to prevent actuation of the base charge even upon receipt by the command signal receiving and processing module of a command signal to fire;

use of a charge storage device such as a capacitor together with a firing circuit, so that upon receipt by the command signal receiving and processing module of a command signal to fire, the capacitor is connected via the firing circuit to the base charge, to cause a current in the firing circuit sufficient to actuate the base charge, the activation/deactivation module comprising a discharge mechanism to selectively bleed charge away from the charge storage device as long as at least one state sensor senses environmental conditions that fall outside the pre-determined parameters suitable for blasting;

use of a clock to count down a deployment window, within which the at least one state sensor is inactive, or within which the wireless detonator is non-responsive to the at least one state sensor, after which the at least one state sensor senses the at least one environmental condition in the immediate vicinity of the detonator assembly, and the detonator assembly is responsive to the at least one environmental condition;

use of a clock to count-down a time-window for a blasting event, wherein the state sensors are active to sense the at least one environmental condition of the immediate vicinity of the assembly only within the time-window;

sensing at least one environmental condition selected from: temperature, light, motion, acceleration, vibration, humidity, density, and pressure;

wireless signal transmission means, for transmitting to an associated blasting machine, hand-held device or logger, data corresponding to the environment condition in its immediate vicinity at the blast site;

use of a wireless electronic primer for use in connection with a blasting machine, the blasting machine controlling the wireless electronic primer via at least one wireless command signal.

What is claimed is:

1. A method of removing restrictive formations within soil, comprising:
loading a charge spool with a charge mechanism onto a charge application plow; securing into position and guiding the charge mechanism through a plurality of routing pulleys and a cut-off assembly into a charge channel;
a tow vehicle either pulling or supporting the charge application plow;
advancing the tow vehicle while simultaneously vibrating the charge application plow;
lowering a plurality of shanks attached to the charge application plow to a desired depth within the soil;
rolling off the charge mechanism and locating the charge mechanism at a prescribed depth within the restrictive formations or just below them;
determining whether a desired span of charge mechanism is laid or not;
providing a de-cementing compound mixture within the desired span of charge mechanism;
severing the charge mechanism from a remaining quantity on the charge spool;
attaching a detonator to the charge mechanism;
covering the exposed surface portion of the charge mechanism with loose soil;
attaching the detonator to a firing mechanism;
detonating the charge mechanism;
mixing the de-cementing compound mixture by a force of the detonation within the restrictive formations; and
chemically altering the formerly restrictive formations to prevent them from re-cementing themselves over time; thereby
preventing subsequent re-constitution of the formerly restrictive formations.

2. The method of claim 1, further comprising:
configuring the charge mechanism as a charge line.

3. The method of claim 1, further comprising:
configuring the charge mechanism as a charge tube.

4. The method of claim 3, further comprising:
inserting a plug into a first end of the charge tube; and sealing the charge tube.

5. The method of claim 4, further comprising:
attaching a connection from a charge emulsion mixture supply to a second end of the charge tube and activating a pump thereby filling the charge tube with the charge emulsion mixture supply.

6. The method of claim 5, further comprising:
the connection is a charge filling hose connection.

7. The method of claim 5, further comprising:
the connection is a charge emulsion supply connection.

8. The method of claim 4, further comprising:
upon filling, plugging and sealing the first and second ends of the charge tube.

9. The method of claim 1, further comprising:
configuring the tow vehicle as a rubber-tire vehicle.

10. The method of claim 1, further comprising:
configuring the tow vehicle as a track vehicle.

11. The method of claim 1, further comprising:
configuring the charge mechanism with a mixture of ammonium nitrate sensitized by benign organic compounds or sensitizers and/or the addition of a small particle size aluminum or aluminum hydroxide blend; and
the organic compound or the aluminum sensitizing the ammonium nitrate.

12. The method of claim 1, further comprising:
configuring the charge mechanism with PETN.

13. The method of claim 1, further comprising:
configuring the charge mechanism with ANBO, a 94% ammonium nitrate plus 6% bio oil, along with and ammonium nitrate based emulsions.

14. The method of claim 1, further comprising:
assessing, surveying the soil, and customizing a computer application to the soil;

entering soil parameters into a system computer, where the parameters comprise depth and thickness of a target restrictive formation, and an estimated load of the charge required;

forcing a shockwave to travel into the restrictive formations;

shattering the restrictive formation features and fracturing the soil particles;

lifting and loosening overlying soils;

expanded gases venting themselves upward moving and mixing the overlying soils; and the overlying soils settling back into position in a looser arrangement thereby fracturing the formerly restrictive formations.

15. The method of claim 1, further comprising:

utilize a series of muffled explosions which are rapidly absorbed by the restrictive formations within the soil; and utilizing an absence of solid rock and a smaller shot system thereby reducing a net vibration and air-blast impact.

16. The method of claim 1, further comprising:

utilizing row by row activation and a series of rows being activated, thereby limiting vibration and air blast impact.

17. The method of claim 1, further comprising:

following a shock wave resulting from the detonation by only milliseconds, an expanding gas volume providing displacement and lift to the layer of restrictive formations and overlying soils;

the overlying soils rapidly absorbing the shock wave influence such that a vibration and air blast of the reaction are translated into a muffling influence by the overlying soils.

* * * * *